May 7, 1940.     J. R. PEIRCE ET AL     2,199,548
ACCOUNTING MACHINE
Filed Nov. 22, 1934     24 Sheets-Sheet 2

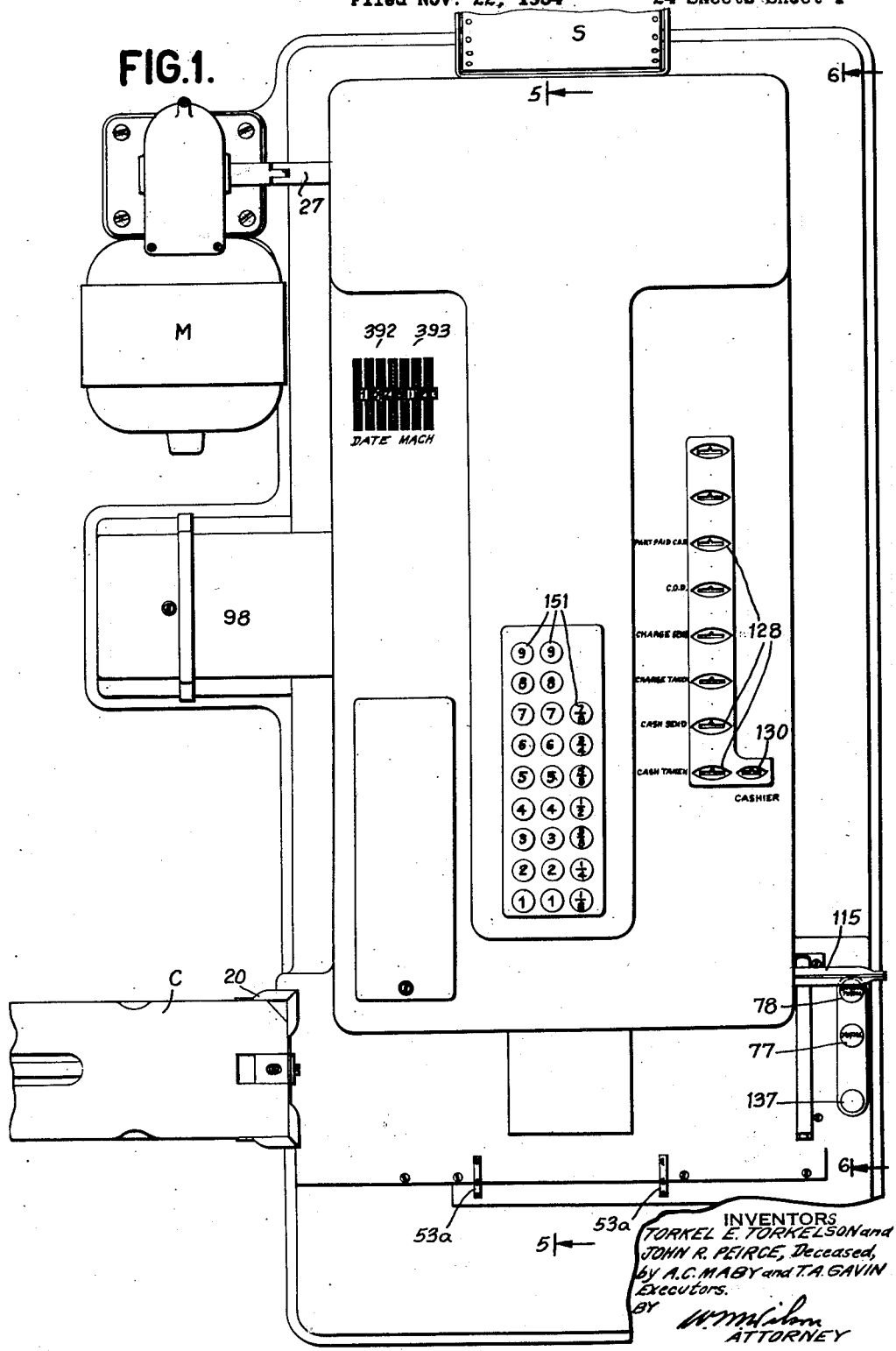

INVENTORS
TORKEL E. TORKELSON and
JOHN R. PEIRCE, Deceased,
by A.C. MABY and T.A. GAVIN
Executors.

BY
W. M. Wilson
ATTORNEY

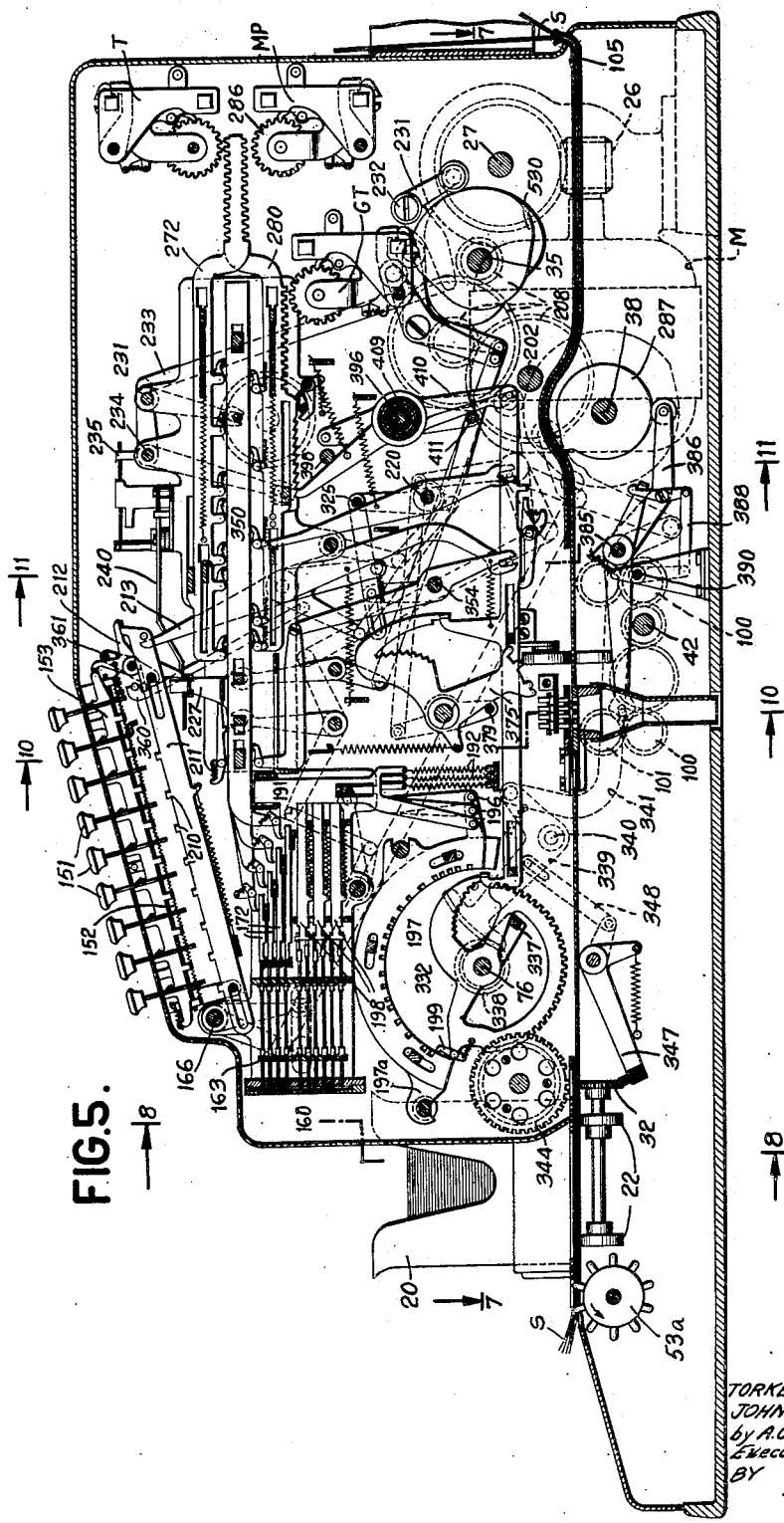

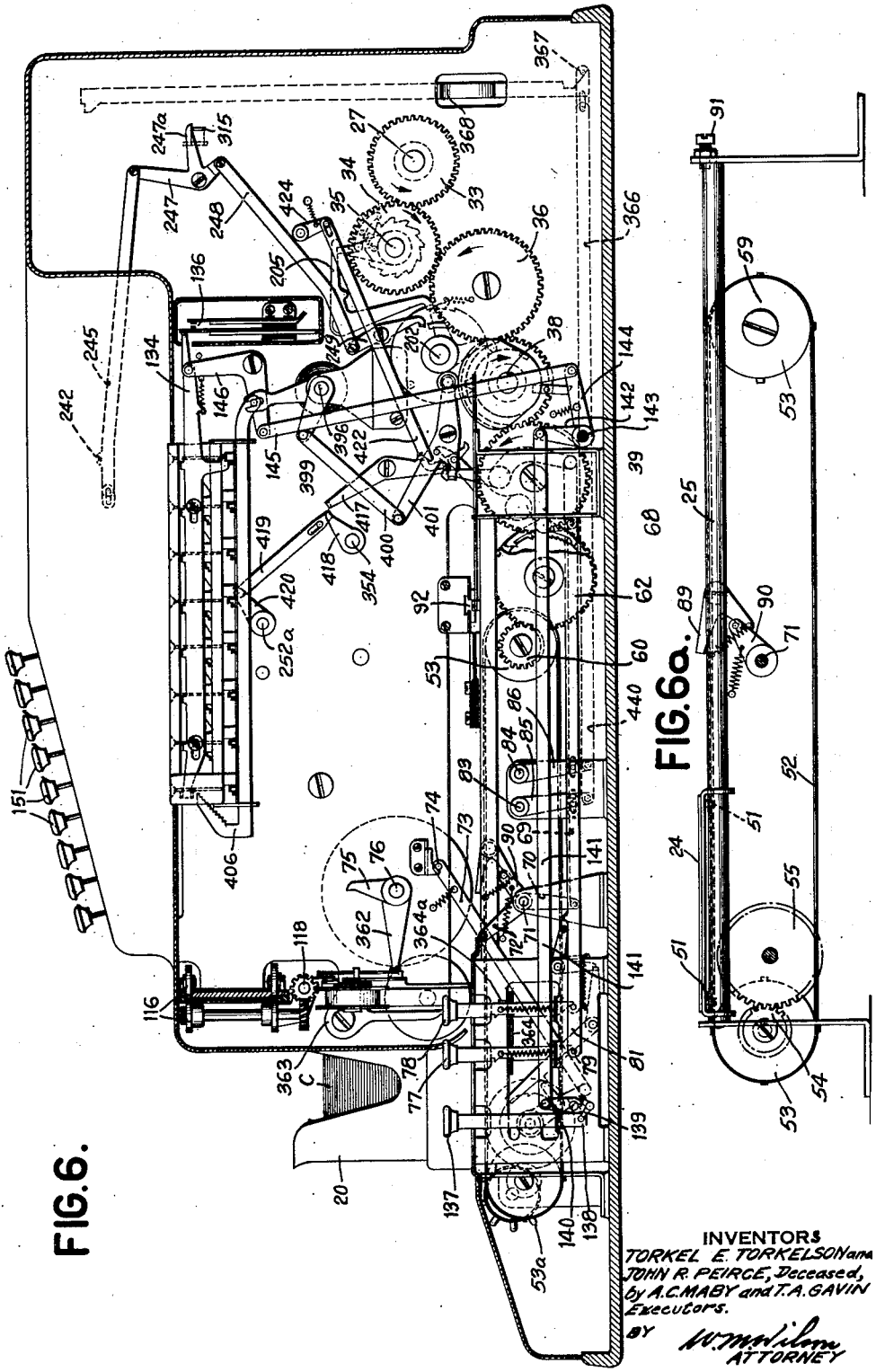

May 7, 1940.    J. R. PEIRCE ET AL    2,199,548
ACCOUNTING MACHINE
Filed Nov. 22, 1934    24 Sheets-Sheet 5

INVENTORS
TORKEL E. TORKELSON and
JOHN R. PEIRCE, Deceased,
by A.C.MABY and T.A.GAVIN
Executors.
BY
W.M.Wilm
ATTORNEY May 7, 1940. J. R. PEIRCE ET AL 2,199,548
ACCOUNTING MACHINE
Filed Nov. 22, 1934 24 Sheets-Sheet 6
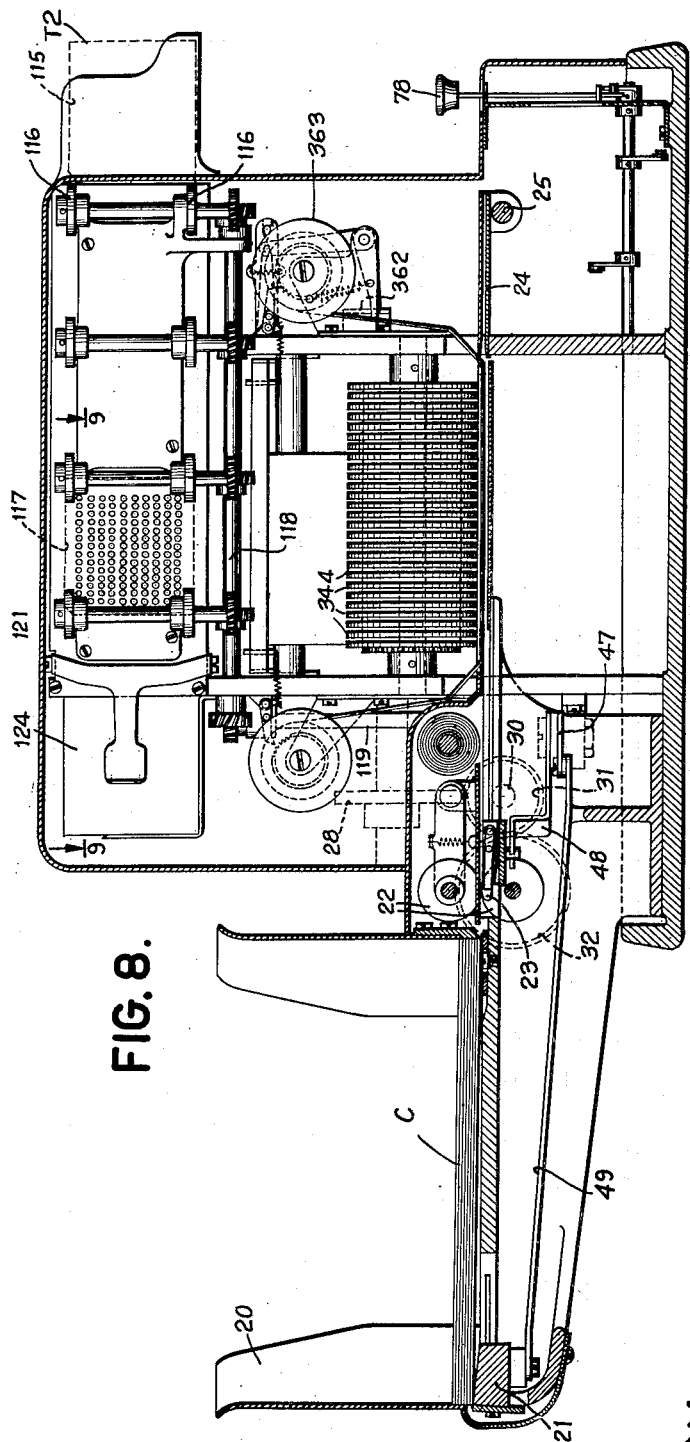
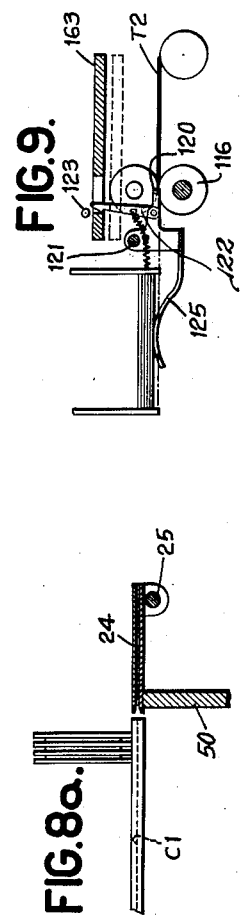
INVENTORS
TORKEL E. TORKELSON and
JOHN R. PEIRCE, Deceased,
by A.C.MABY and T.A.GAVIN
Executors.
BY
ATTORNEY May 7, 1940.　　　J. R. PEIRCE ET AL　　　2,199,548
ACCOUNTING MACHINE
Filed Nov. 22, 1934　　　24 Sheets-Sheet 7
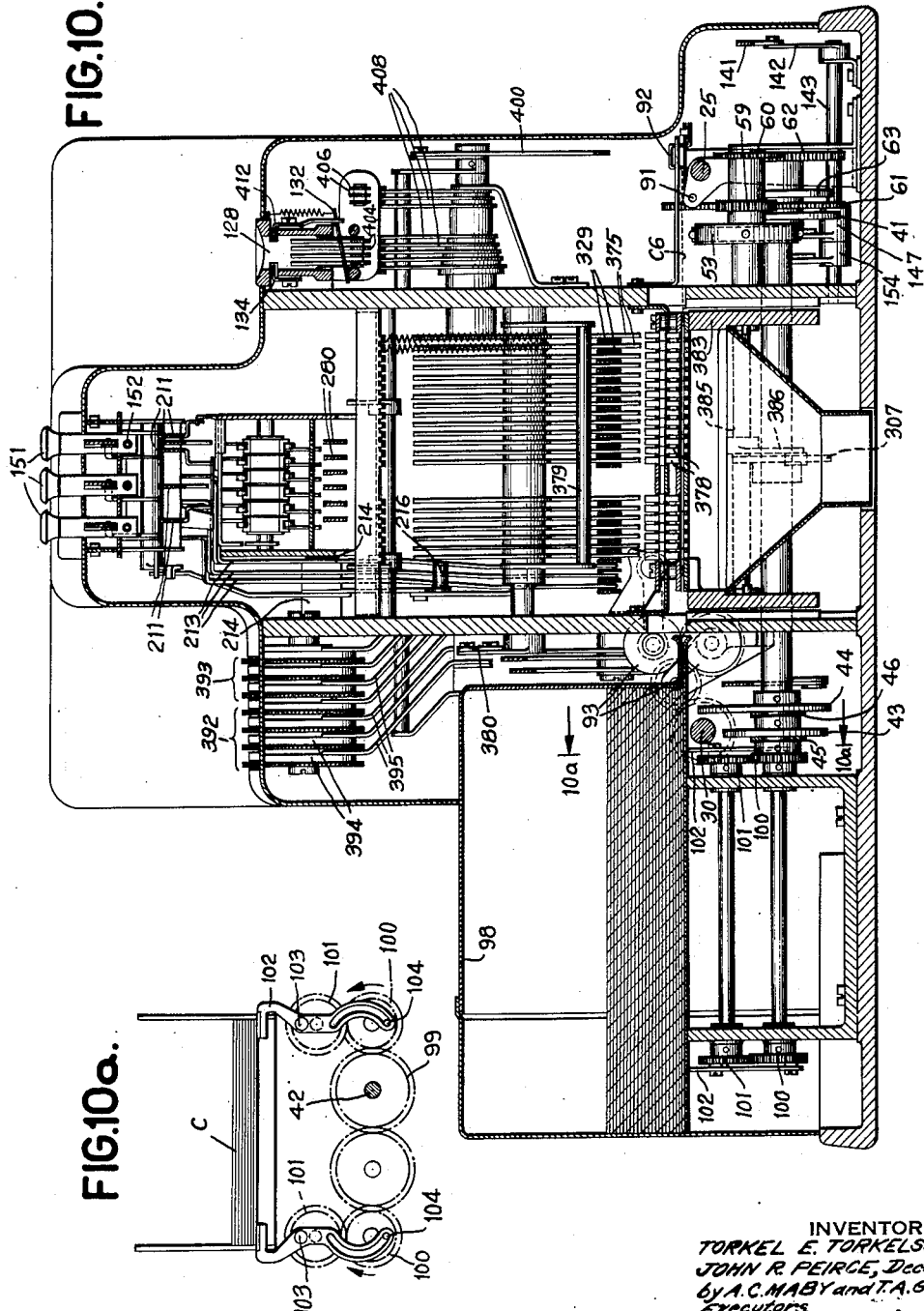
INVENTORS
TORKEL E. TORKELSON and
JOHN R. PEIRCE, Deceased,
by A.C.MABY and T.A.GAVIN
Executors.
BY W. M. Wilson
ATTORNEY May 7, 1940.　　　J. R. PEIRCE ET AL　　　2,199,548
ACCOUNTING MACHINE
Filed Nov. 22, 1934　　　24 Sheets-Sheet 8
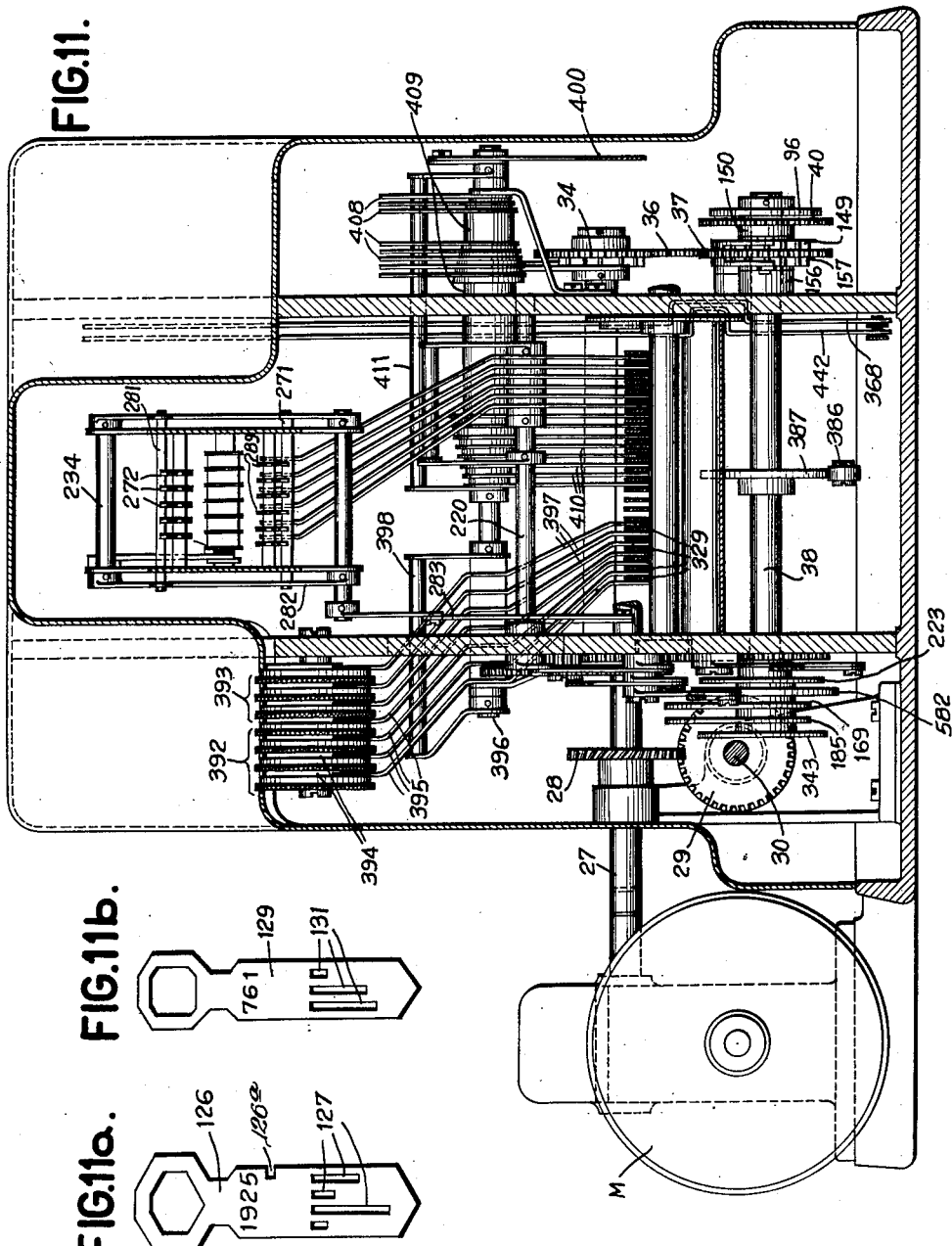
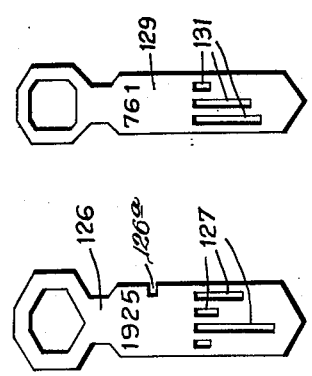
INVENTORS
TORKEL E. TORKELSON and
JOHN R. PEIRCE, Deceased,
by A.C.MABY and T.A.GAVIN
Executors.
BY
ATTORNEY

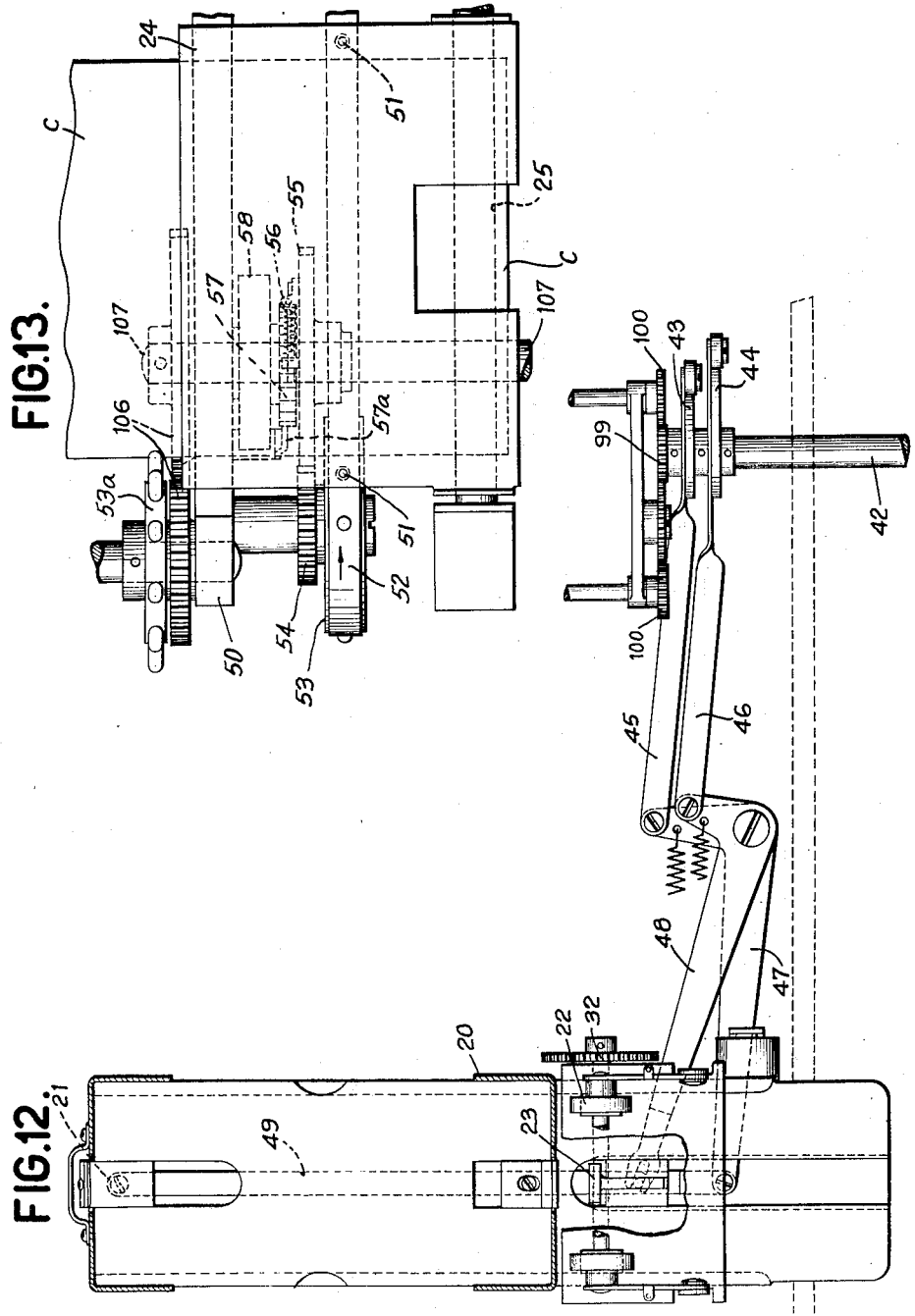

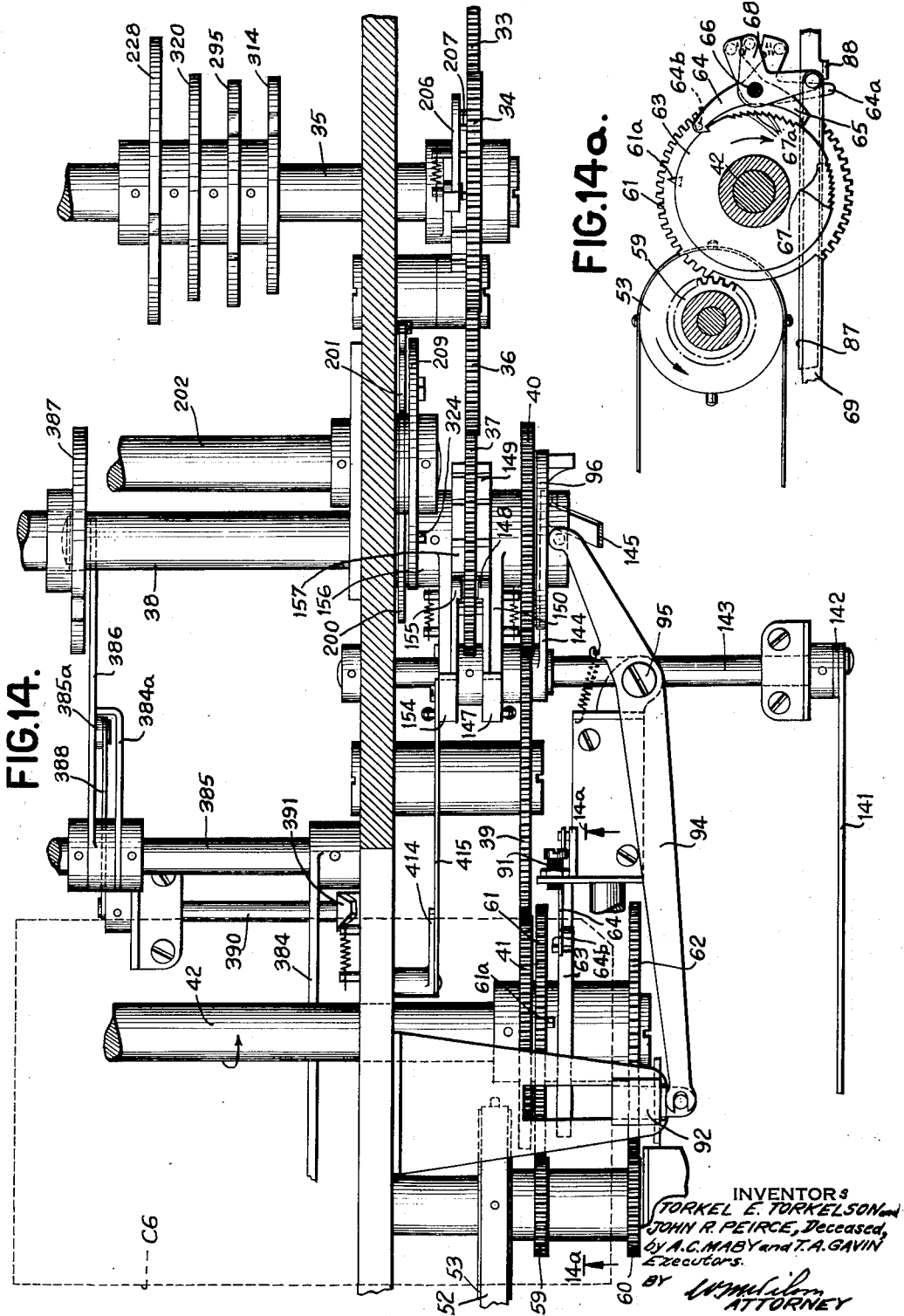

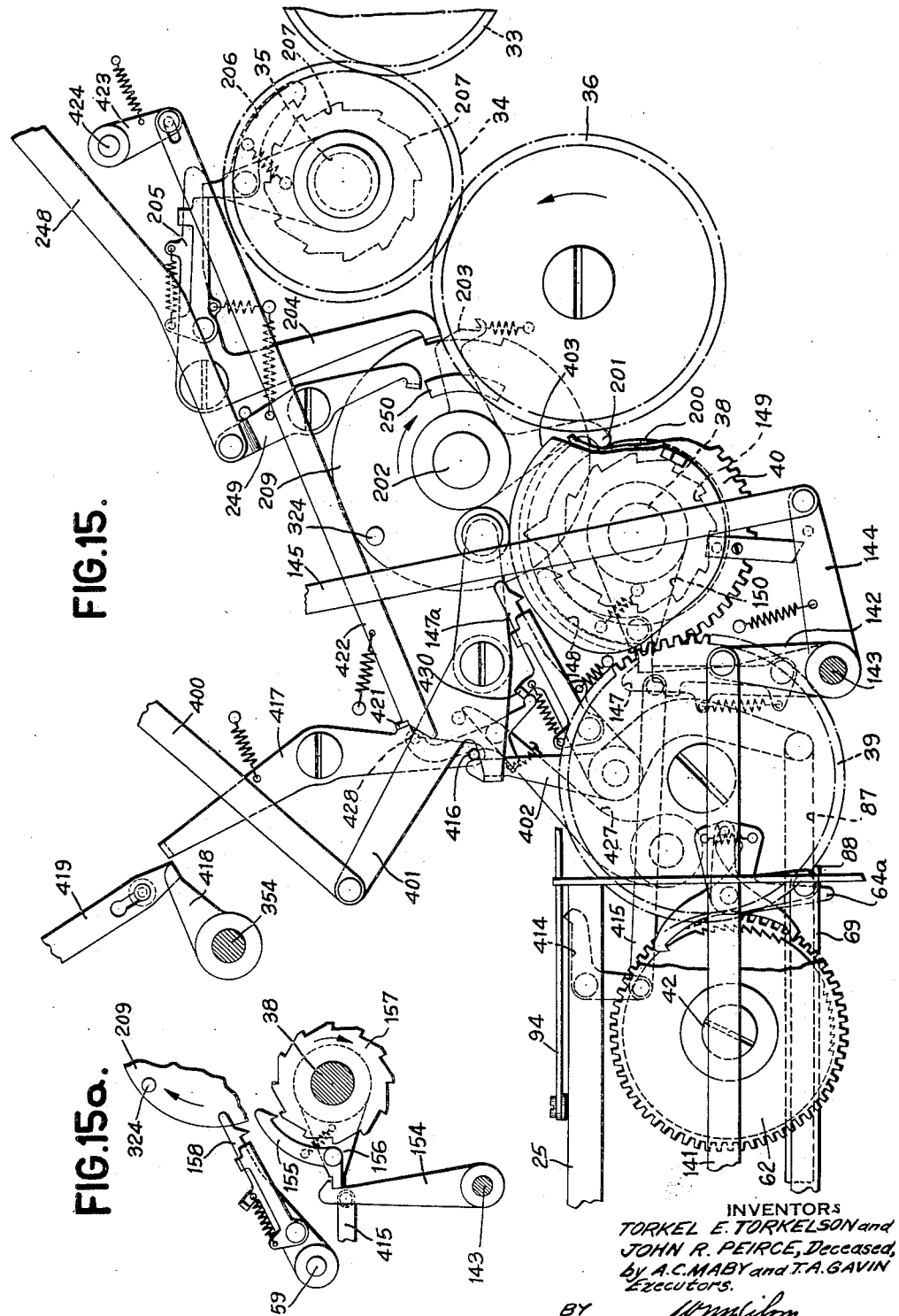

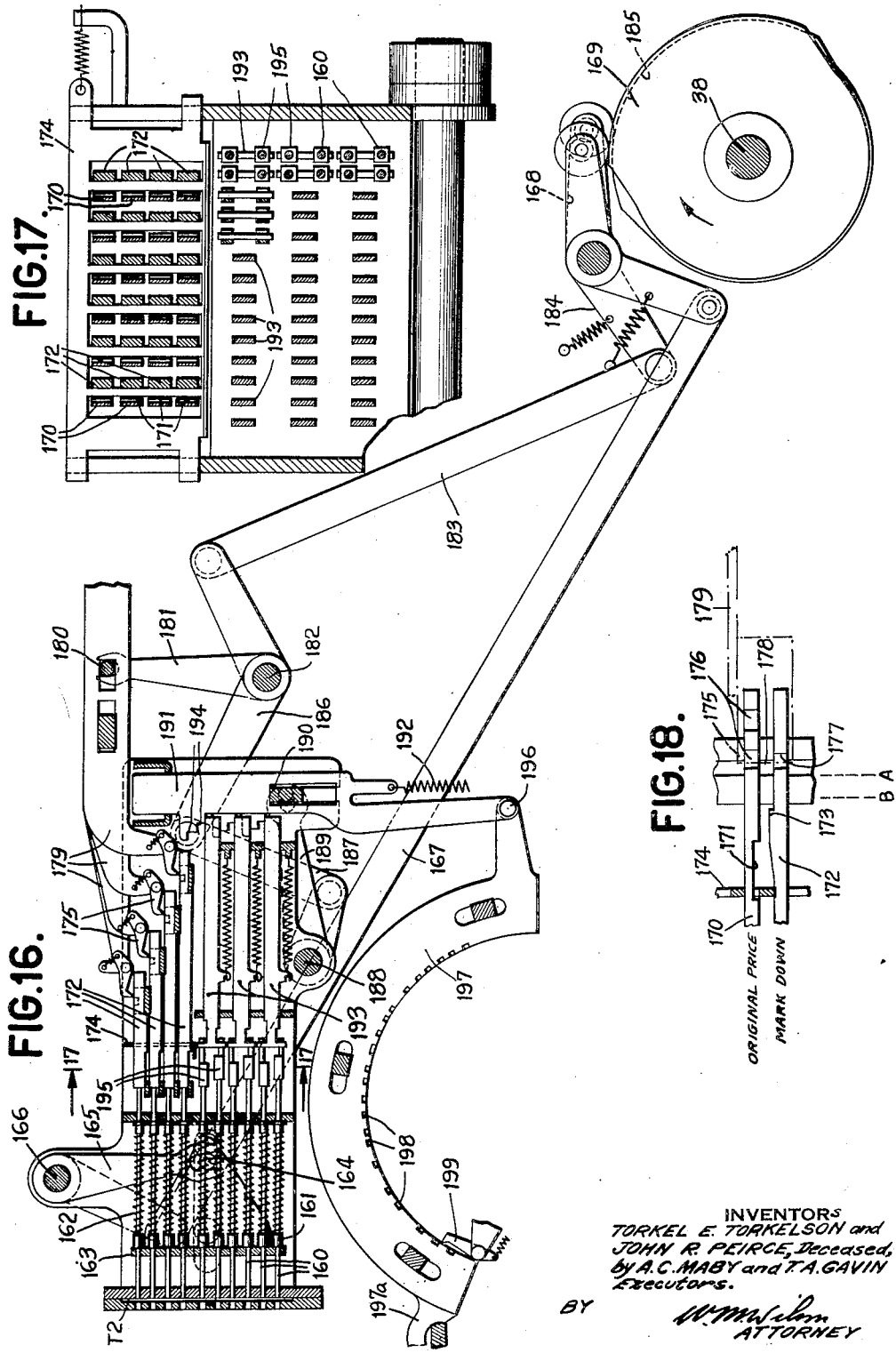

May 7, 1940.   J. R. PEIRCE ET AL   2,199,548
ACCOUNTING MACHINE
Filed Nov. 22, 1934   24 Sheets-Sheet 13

INVENTORS
TORKEL E. TORKELSON and
JOHN R. PEIRCE, Deceased,
by A.C. MABY and T.A. GAVIN
Executors.
BY W. M. Wilson
ATTORNEY

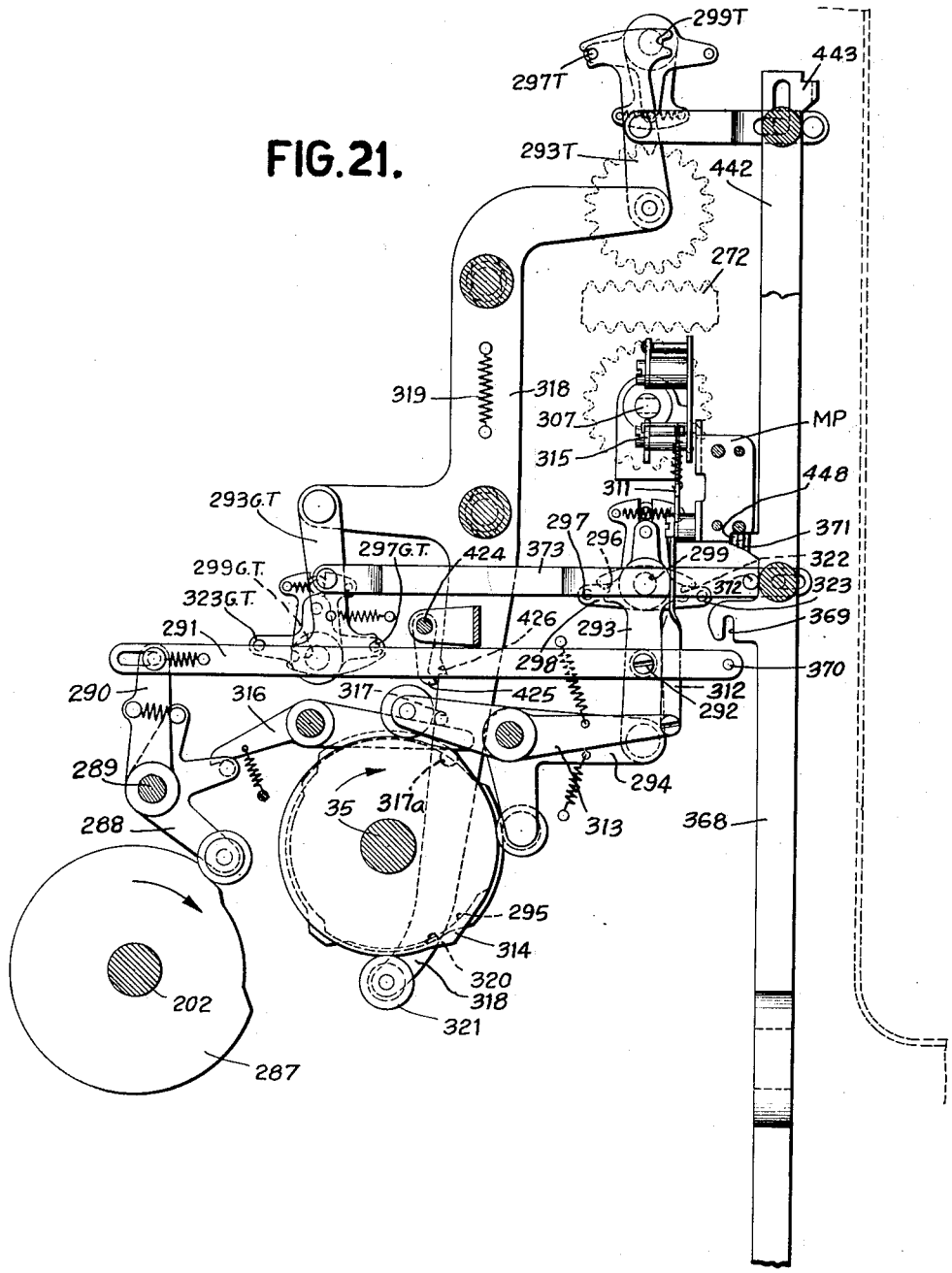

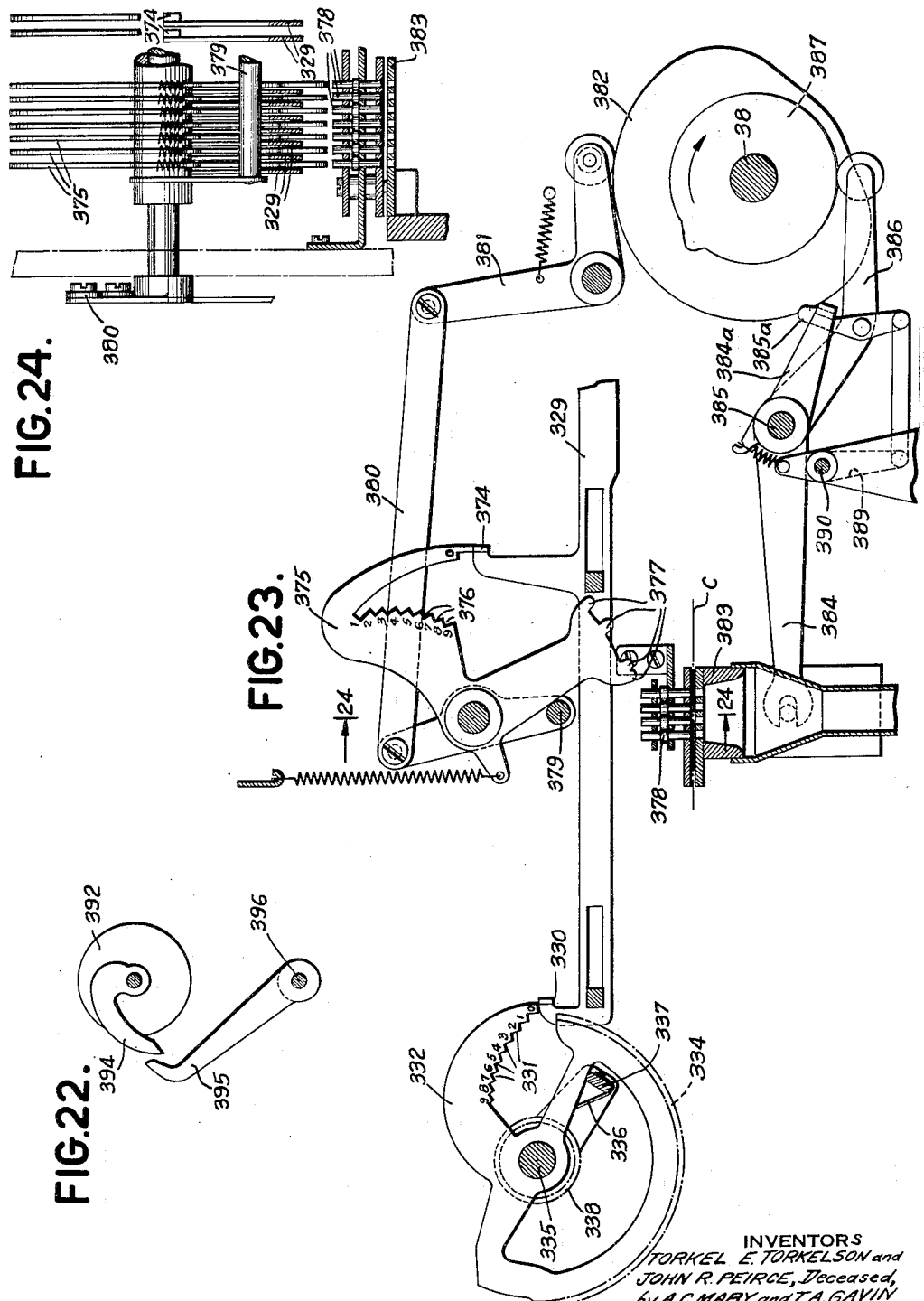

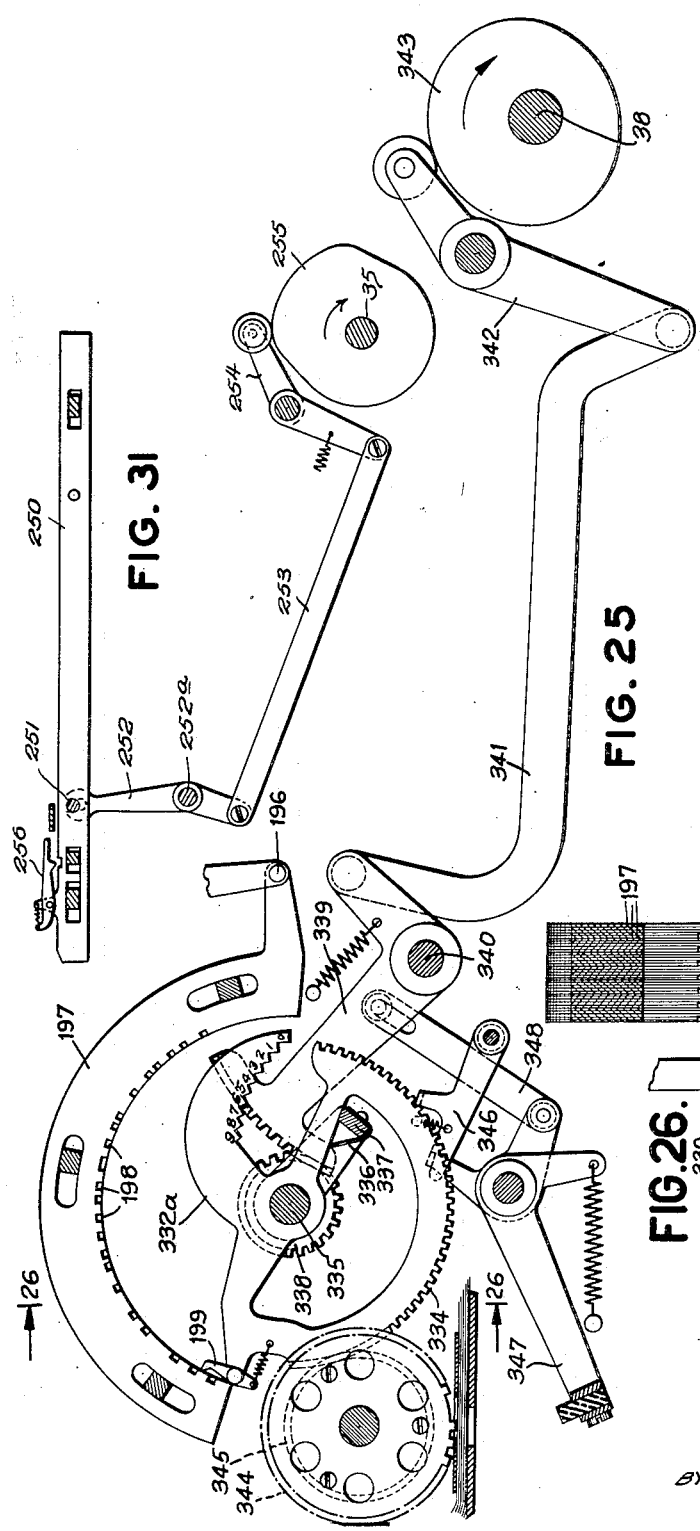

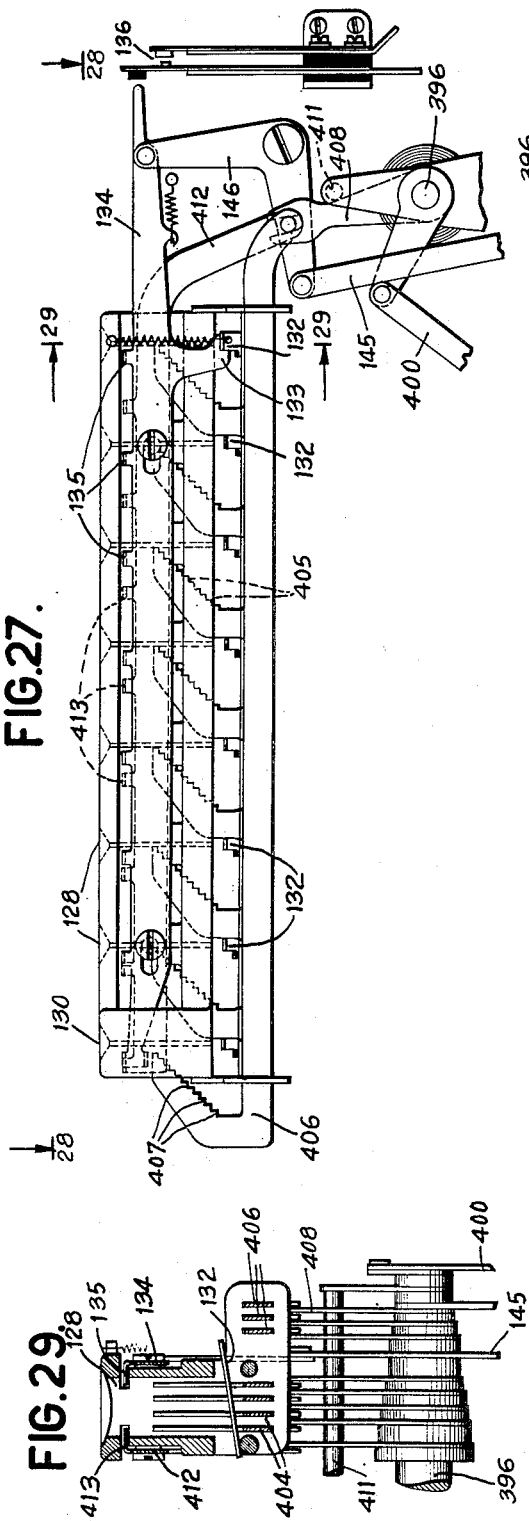
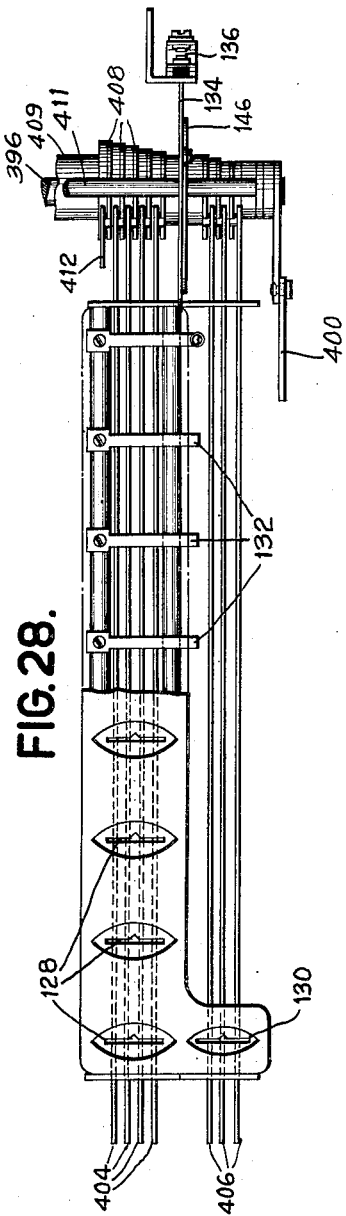

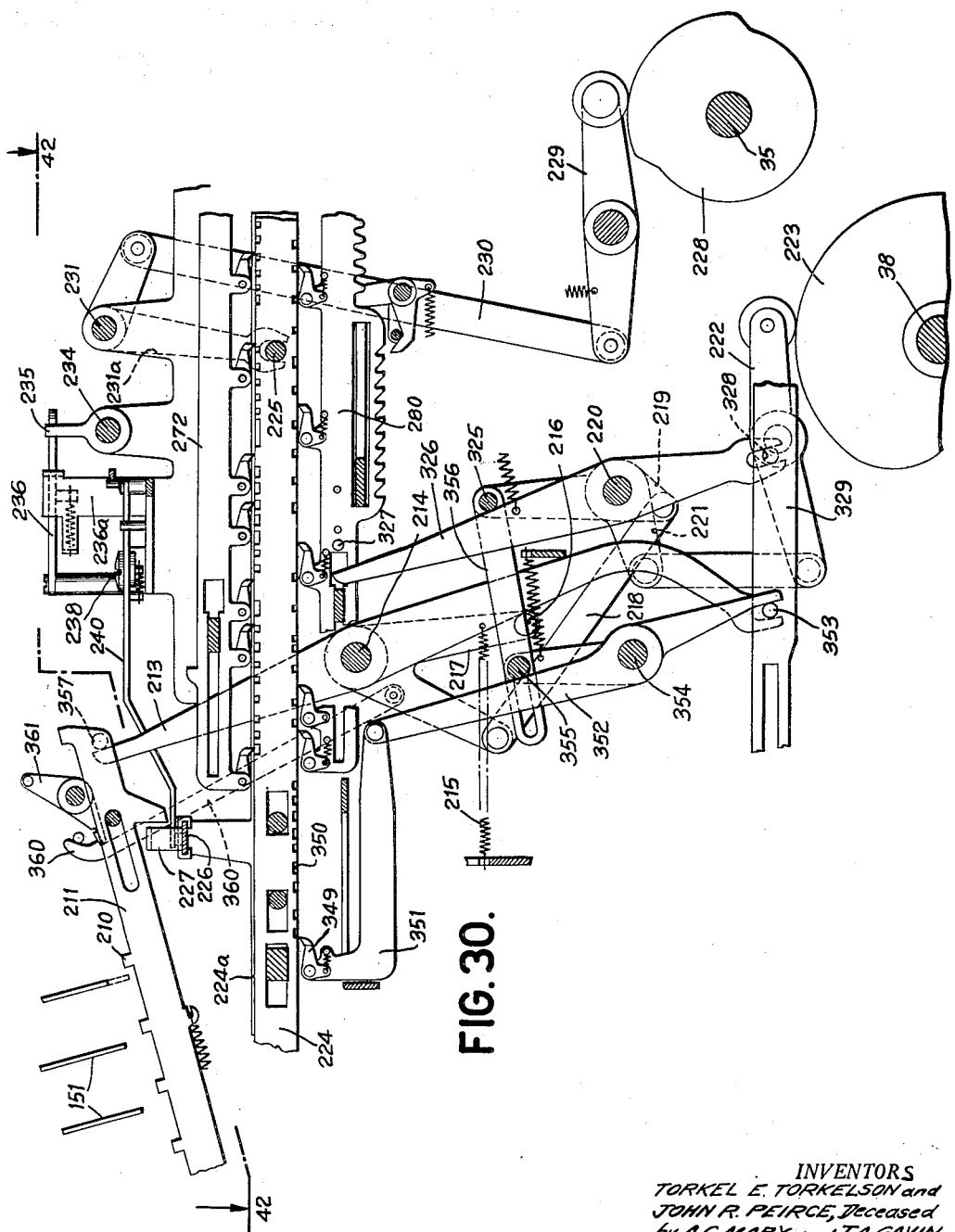

May 7, 1940.    J. R. PEIRCE ET AL    2,199,548
ACCOUNTING MACHINE
Filed Nov. 22, 1934    24 Sheets-Sheet 19
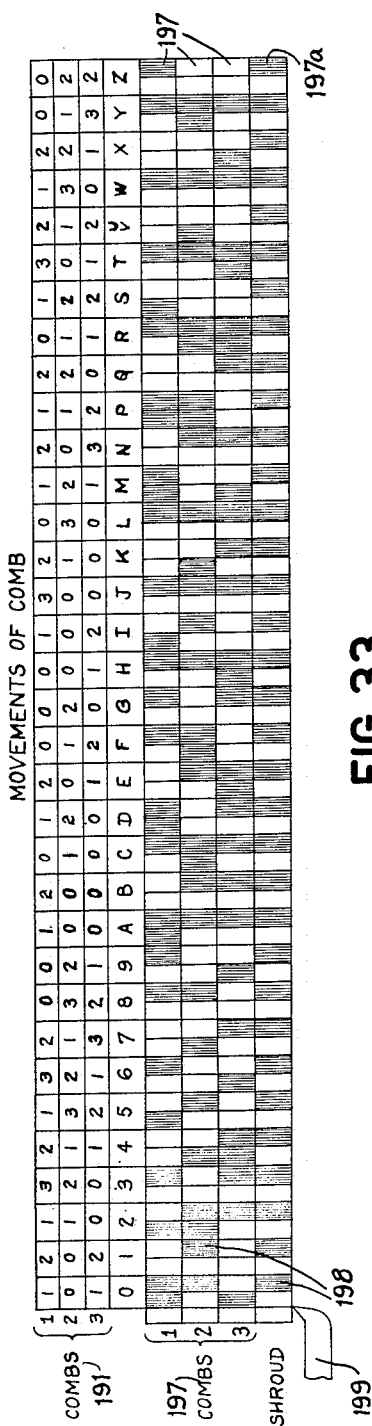
FIG. 32.
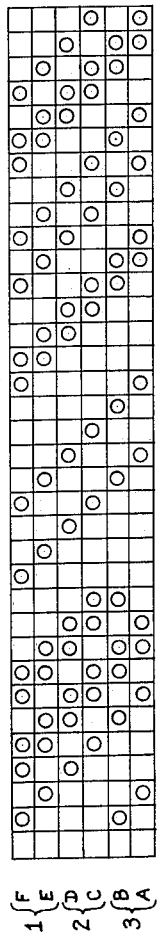
FIG. 33.
FIG. 32a.
⊕⊕ } —3 STEPS    ⊕⊕ } —1 STEP
+⊕ } —2 STEPS    ++ } —NO STEPS
INVENTORS
TORKEL E. TORKELSON and
JOHN R. PEIRCE, Deceased,
by A.C.MABY and T.A.GAVIN
Executors.
BY
W. M. Wilson
ATTORNEY

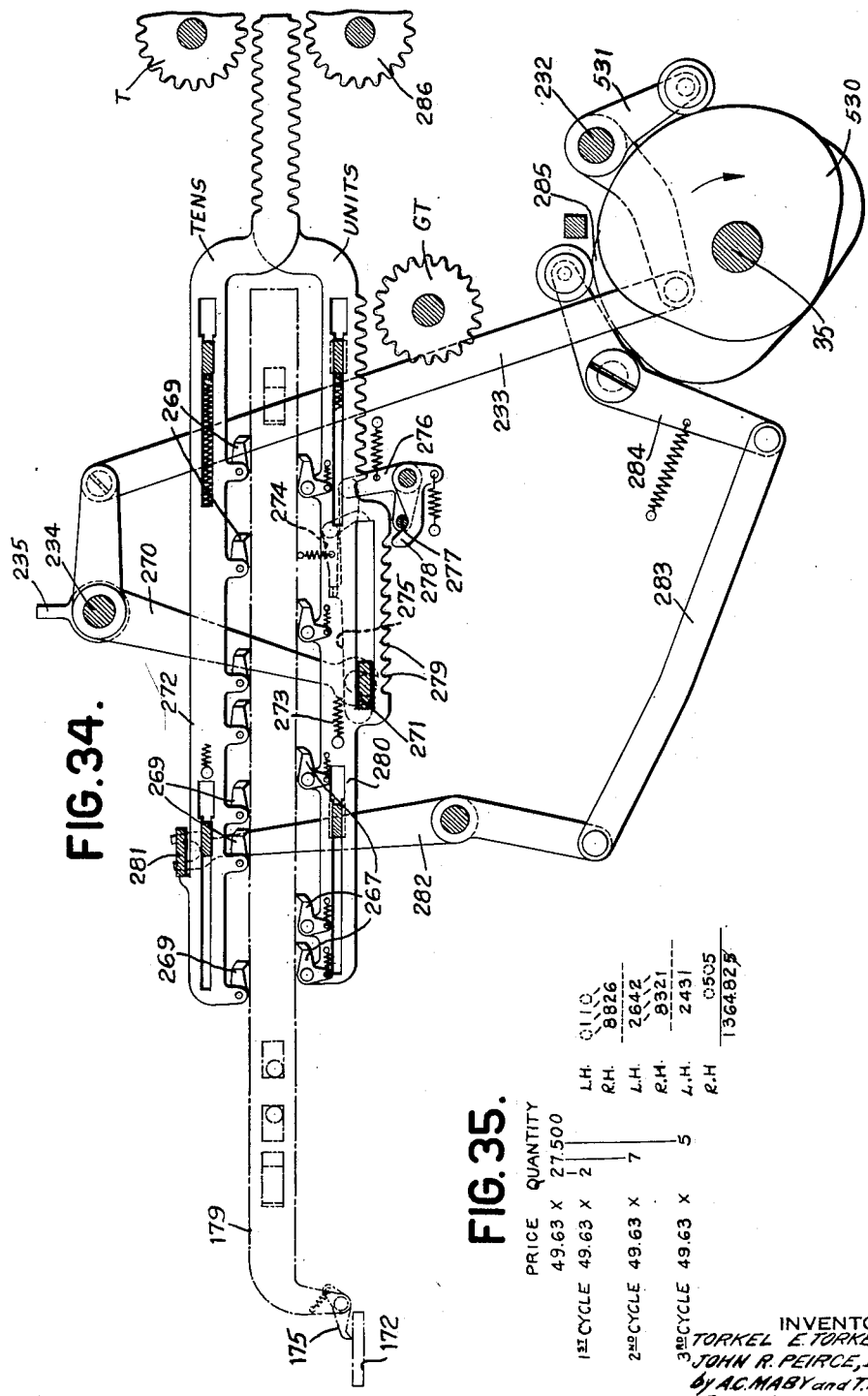

May 7, 1940.  J. R. PEIRCE ET AL  2,199,548
ACCOUNTING MACHINE
Filed Nov. 22, 1934  24 Sheets-Sheet 21
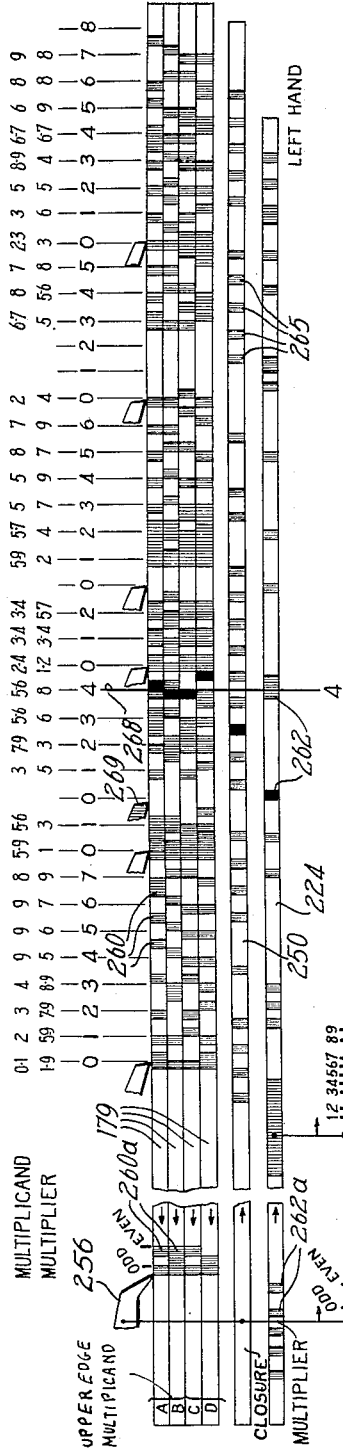
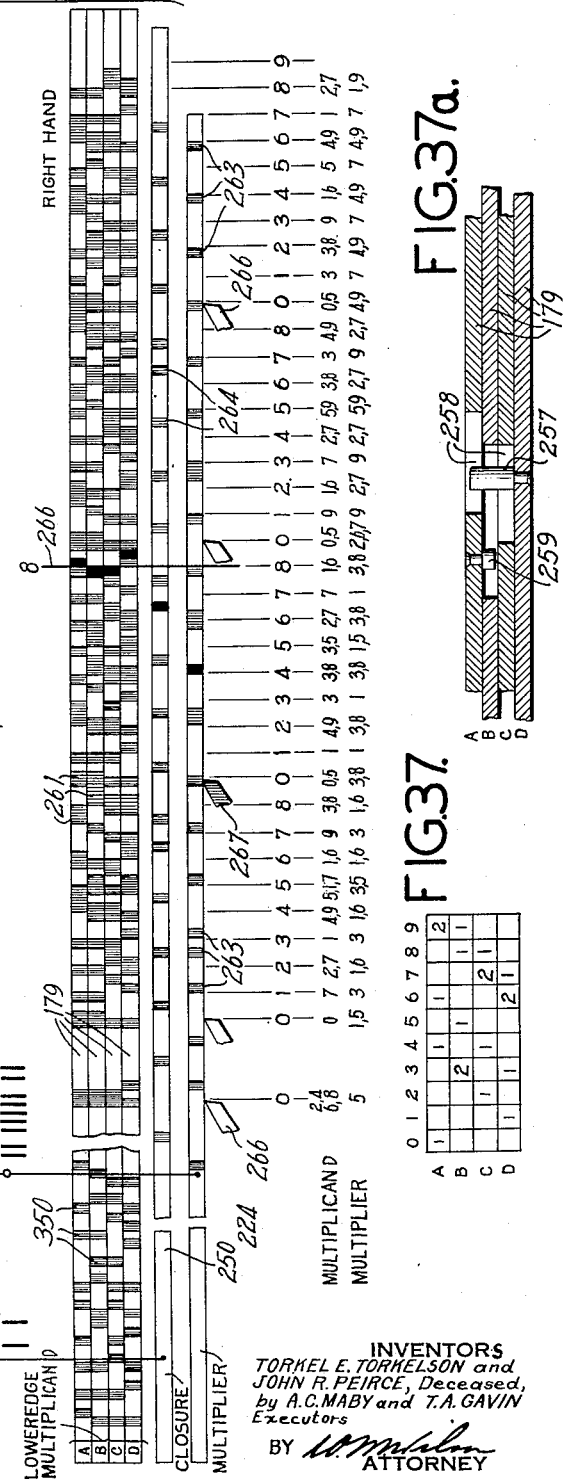
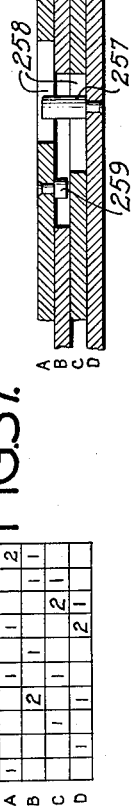
INVENTORS
TORKEL E. TORKELSON and
JOHN R. PEIRCE, Deceased,
by A.C. MABY and T.A. GAVIN
Executors
BY
ATTORNEY May 7, 1940.   J. R. PEIRCE ET AL   2,199,548
ACCOUNTING MACHINE
Filed Nov. 22, 1934    24 Sheets-Sheet 22

INVENTORS
TORKEL E. TORKELSON and
JOHN R. PEIRCE, Deceased
by A.C.MABY and T.A.GAVIN
Executors.
BY
ATTORNEY May 7, 1940.    J. R. PEIRCE ET AL    2,199,548
ACCOUNTING MACHINE
Filed Nov. 22, 1934    24 Sheets-Sheet 23

INVENTORS
TORKEL E. TORKELSON and
JOHN R. PEIRCE, Deceased,
by A.C.MABY and T.A.GAVIN
Executors.

BY
*W. M. Wilson*
ATTORNEY

May 7, 1940.  J. R. PEIRCE ET AL  2,199,548
ACCOUNTING MACHINE
Filed Nov. 22, 1934  24 Sheets-Sheet 24
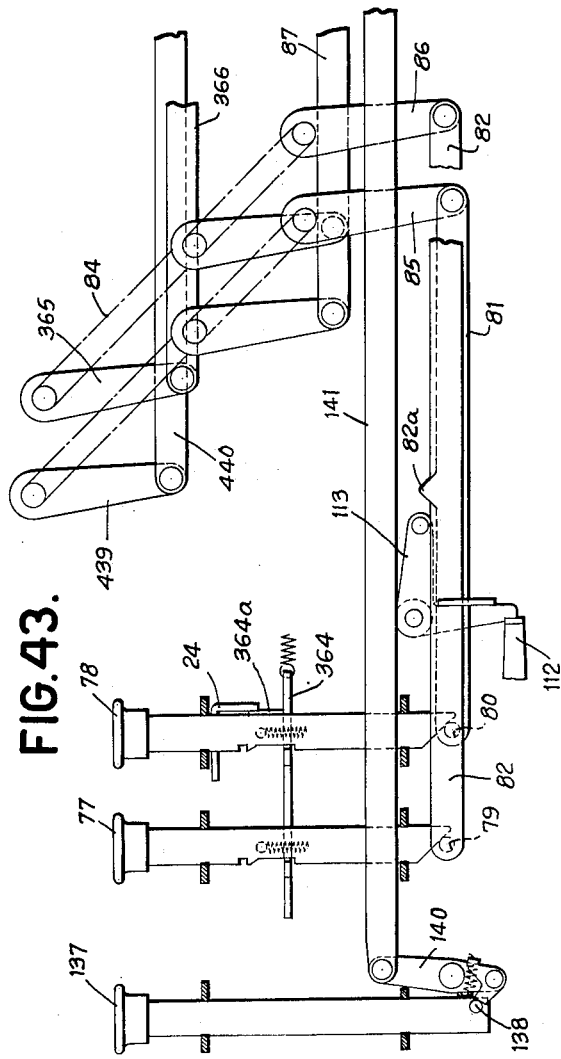
INVENTORS
TORKEL E. TORKELSON and
JOHN R. PEIRCE, Deceased,
by A.C. MABY and T.A. GAVIN
Executors.
BY
ATTORNEY Patented May 7, 1940

2,199,548

UNITED STATES PATENT OFFICE 2,199,548

ACCOUNTING MACHINE

John Royden Peirce, deceased, late of New York, N. Y., by Adelbert C. Maby, Jamaica, N. Y., and Thomas A. Gavin, Binghamton, N. Y., executors, and Torkel E. Torkelson, Baldwin, N. Y., assignors to International Business Machines Corporation, New York, N. Y., a corporation of New York Application November 22, 1934, Serial No. 754,300

10 Claims. (Cl. 235—61.6)

This invention relates to accounting machines and more particularly to machines for recording sales and automatically preparing sales slips or receipts. The machine has particular utility in department store systems where articles to be sold are provided with and usually have attached thereto a price tag on which identifying data are represented in the form of combination hole perforations. When an article is sold by a sales person, the price tag is removed from the article and inserted in the machine together with a key or token which identifies the person making the sale, and a cashier's key. The machine is then sent through a cycle of operations during which the perforated data on the price tag is analyzed and mechanism is controlled thereby to cause printing to take place upon a sales slip and also upon a record card of the type suitable for use in electrical accounting machines. At the same time, the value of the sale is entered into suitable accumulating mechanism.

For each different article sold, the representative price tag is inserted in the machine and its data recorded on the sales slip and tabulating card.

The machine is provided with a multiplying mechanism which derives one of the factors, namely, the multiplicand, from the perforated price tag and receives the multiplier from manually positionable keys. If a sale is made of more than one article of an identical nature, it is only necessary to insert one price tag and set up on the keys the number of articles. The machine will then automatically compute the product and print on the sales slip and tabulating card the total number of articles and their total price and enter the data into the accumulators.

One of the principal objects of the invention is to provide a simple multiplying mechanism for record controlled machines in which the mechanism required for carrying out the operations of multiplying are simple in structure and in which the method of obtaining partial products and combining the same to form the complete product of two factors forms a compact unit within the machine.

A more specific object of the invention is to provide multiplying mechanism in which multiplying elements are differentially positioned to represent a multiplier and a multiplicand and in which the position of the elements in turn controls the position of reading-out mechanisms which under control of the first elements take a differential position in accordance with the right and left hand components of the partial products derived from a computation.

A further object of the invention is to provide a mechanism for preparing a sales slip in which the machine will automatically record alphabetic data representing a commodity, the quantity, and the unit price of the commodity together with the product of the quantity and the unit price. Provision is made for recording a series of transactions on successive lines of a bill after which the machine will automatically record thereon the total amount of the complete transaction in both printed and perforated form.

A further object of the invention is to provide a machine controlling element in the form of a perforated price tag in which original price perforations may be superseded by perforations representing a new price and in which mechanism is provided which is responsive to the new price perforations themselves to cause the machine to ignore the original perforations.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a plan view of the assembled machine, showing the location of the various controlling keys.

Fig. 2 is a specimen of a price tag whose perforations control the operation of the machine.

Fig. 3 is a specimen of a tabulating card which is prepared by the machine.

Fig. 4 is a specimen of a sales slip which is prepared in duplicate by the machine.

Fig. 5 is a central section of the machine taken substantially along lines 5—5 of Fig. 1.

Fig. 6 is a section taken substantially along lines 6—6 of Fig. 1, the section being taken just within the casing of the machine.

Fig. 6a is a detail showing the mechanism for controlling movement of the record card carriage.

Fig. 8 is a section taken along lines 8—8 of Fig. 5, showing the mechanism for introducing a tabulating card to the printing mechanism.

Fig. 8a is a detail of the card receiving carriage.

Fig. 9 is a detail on lines 9—9 of Fig. 8 of the price tag positioning device.

Fig. 10 is a section taken substantially on lines 10—10 of Fig. 5, showing the location of the punches with respect to the discharge magazine.

Fig. 10a is a detail section taken on lines 10a—10a of Fig. 10, showing the mechanism for elevating the cards in the receiving magazines so that a new card may be introduced thereunder.

Fig. 11 is a section taken on lines 11—11 of Fig. 5, showing certain of the connecting devices of the machine.

Fig. 11a is a detail of a clerk's key.

Fig. 11b is a detail of a cashier's key.

Fig. 12 is a detail of the record card introducing mechanism and the operating connections therefor.

Fig. 13 is a detail in plan view of the card carriage and control mechanism therefor.

Fig. 14 is a plan detail of certain of the clutches and controlling mechanism therefor.

Fig. 14a is a detail of the card carriage escapement mechanism, the section being taken along the lines 14a—14a of Fig. 14.

Fig. 15 is a detail view in elevation of the clutch mechanism shown in Fig. 14.

Fig. 15a is a further detail of parts shown in Figs. 14 and 15.

Fig. 16 is a detail view of the price tag reading mechanism.

Fig. 17 is a section taken on line 17—17 of Fig. 16, showing the mechanism for selecting one of two prices to control machine operations.

Fig. 18 is a detail view showing the arrangement of cuts in bars controlled by the sensing pins of Fig. 16.

Fig. 21 is a section substantially along lines 21—21 of Fig. 19, showing the mechanism for controlling the selection and operation of the accumulators.

Fig. 22 is a detail of cams and follower fingers for controlling the setting of the date and machine number which appears on the record card and sales slip.

Fig. 23 is a detail showing the manner in which the punches are set for operation.

Fig. 24 is a section taken along lines 24—24 of Fig. 23.

Fig. 25 is a detail showing the mechanism for controlling the operation of the printing mechanism.

Fig. 26 is a section taken along lines 26—26 of Fig. 25.

Fig. 27 is a detail of the mechanism for reading the cuts in the clerk and cashier keys.

Fig. 28 is a plan elevation taken on lines 28—28 of Fig. 27.

Fig. 29 is a section taken on lines 29—29 of Fig. 27.

Fig. 30 is a detail showing the relationship between the multiplying combs and the read-out pawls which read the left and right partial products from the combs.

Fig. 31 is a detail of the mechanism for controlling the operation of the closure combs.

Fig. 32 is a development showing the arrangement of notches in printing control mechanism.

Fig. 32a is a diagram showing the combinational arrangement governing the movement of the combs of Fig. 32.

Fig. 33 is a chart showing the combinational arrangement of perforations as made in the price tag to represent the alphabetic designation of the commodities.

Fig. 34 is a detail showing the operation of certain multiplying mechanisms.

Fig. 35 is a diagram showing the principle of operation of the multiplying mechanism.

Fig. 36 is a development showing the arrangement of the cuts on the multiplying combs.

Fig. 37 is a chart showing the steps of movement taken by the various multiplying combs.

Fig. 37a is a detail showing interconnecting mechanism between the multiplying combs.

Fig. 42 is a further detail of the column shifting mechanism of the multiplying devices.

Fig. 43 is a detail of the operating keys and connected devices.

Figure 7:
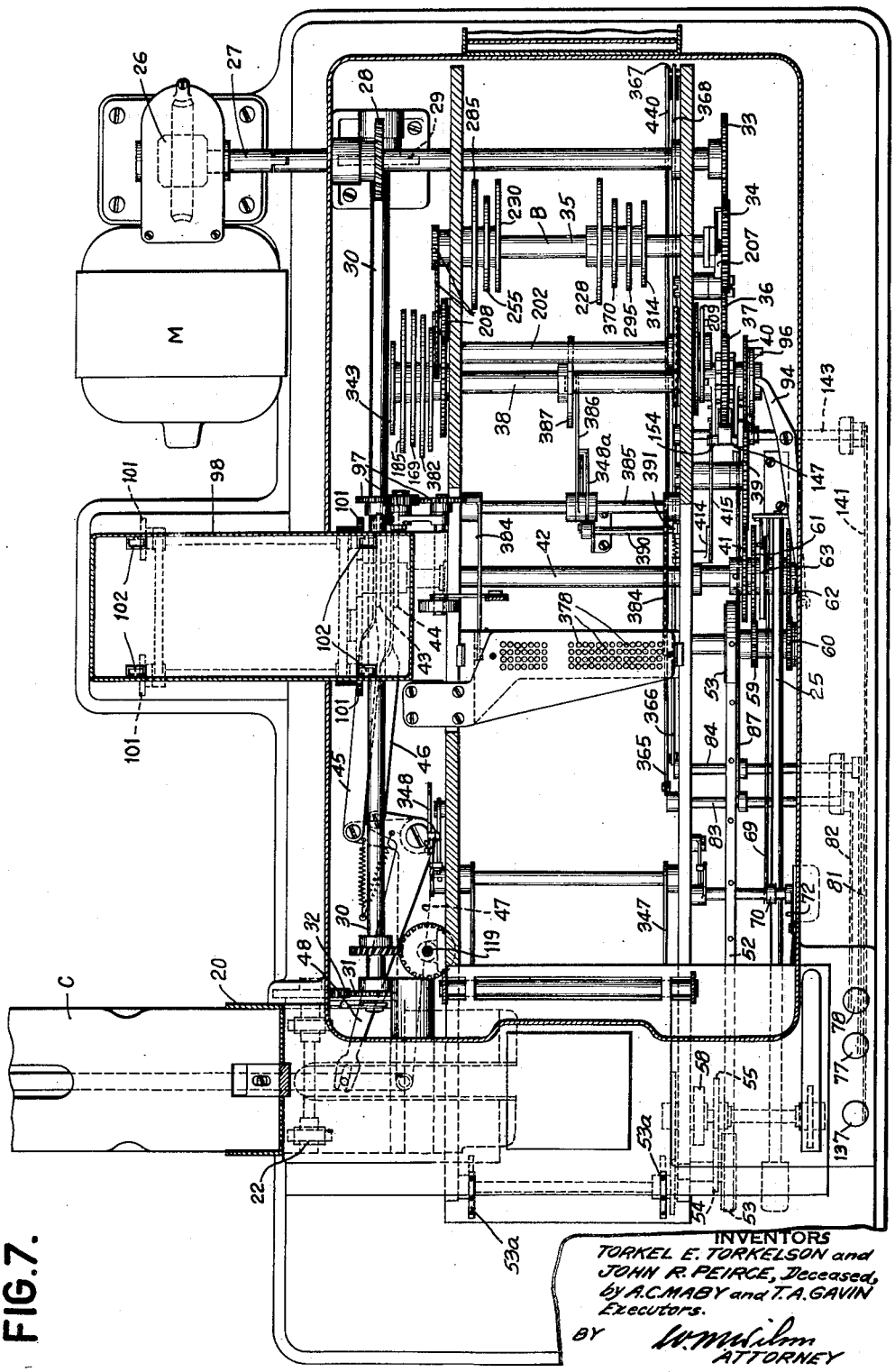
Fig. 7 is a plan section taken substantially along lines 7—7 of Fig. 5 showing the location of the card magazines and the location of the punches for perforating the record cards and sales slip.

Before explaining the mechanical organization of the machine the price tag for controlling its operation and the tabulating card and sales slip as prepared by the machine will be explained to point out the general objectives of the invention.

Price tag

In Fig. 2 is shown a price tag T having an upper portion T1 which receives identifying data in printed form and a lower section T2 in which certain of the identifying data are reproduced in perforated form. The section T2 is divided into two fields separated by a line 10. In the lower field, combination perforations made in one or more of six horizontal lines represent the alphabetic designation of the article; for example, the perforations shown represent "dress." The upper section of T2 receives perforations representing the price of the article. Where the price changes there may also be a so-called "marked down" price and both these prices will appear printed on the portion T1 as shown and in perforated form in the upper field of T2. These perforations are in combinational form and arranged on the four horizontal lines, and where both "original" and "marked down" prices are perforated, the two values are punched in alternate vertical columns. In order to distinguish the two prices, they are shown in Fig. 2 with the "original" price perforations representing "$39.50" as full line circles and the "marked down" price perforations "$29.50" as dotted line circles.

As will be pointed out in the mechanical description, when the price tag contains two prices, the perforations representing the "marked down" price will dominate in controlling the operation of the machine.

Upon the sale of an article, the lower portion T2 of the price tag is separated from the upper portion which latter may remain on the article and the lower portion is inserted in the machine as will be hereinafter described.

Sales slip

The sales slip S is shown in Fig. 4 and is provided with holes along its edges for feeding purposes. For each price tag inserted in the machine there will be printed a line of data 11 and the lines will be printed in order from bottom to top of the enclosed area 12. Thus, on the slip shown in Fig. 4, the first price tag related to "soap," having the unit value of twenty-five cents. There being three such articles, the multiplying mechanism in the machine is brought into operation and the product of "75" recorded on the same line. After all the items have been entered on lines 11, the operator will send the machine through a total taking operation during which identifying data will be printed on line 13 together with the total amount of the transaction. This data will also appear a second time on line 15 in the upper part of the sales slip. After line 13 has been printed, perforations corresponding to the data printed will be made in field 14 of the next following sales slip and printing will take place on line 15 of the first slip. The section containing this field 14 is later separated and used for accounting purposes. In Fig. 4, the perforations shown in field 14 relate to the transactions recorded on the preceding sales slip and do not necessarily correspond to the printed information on line 15.

Tabulating card

The tabulating card which is prepared simultaneously with the sales slip is shown in Fig. 3. Entries on the card are made from top to bottom and correspond to the entries on lines 11 of the sales slip. During total taking operations identifying data and the total amount of the transaction are printed on line 16 which corresponds to the data entered on line 13 of the sales slip and this data is correspondingly perforated in field 17.

Record card feeding mechanism

Figure 38:
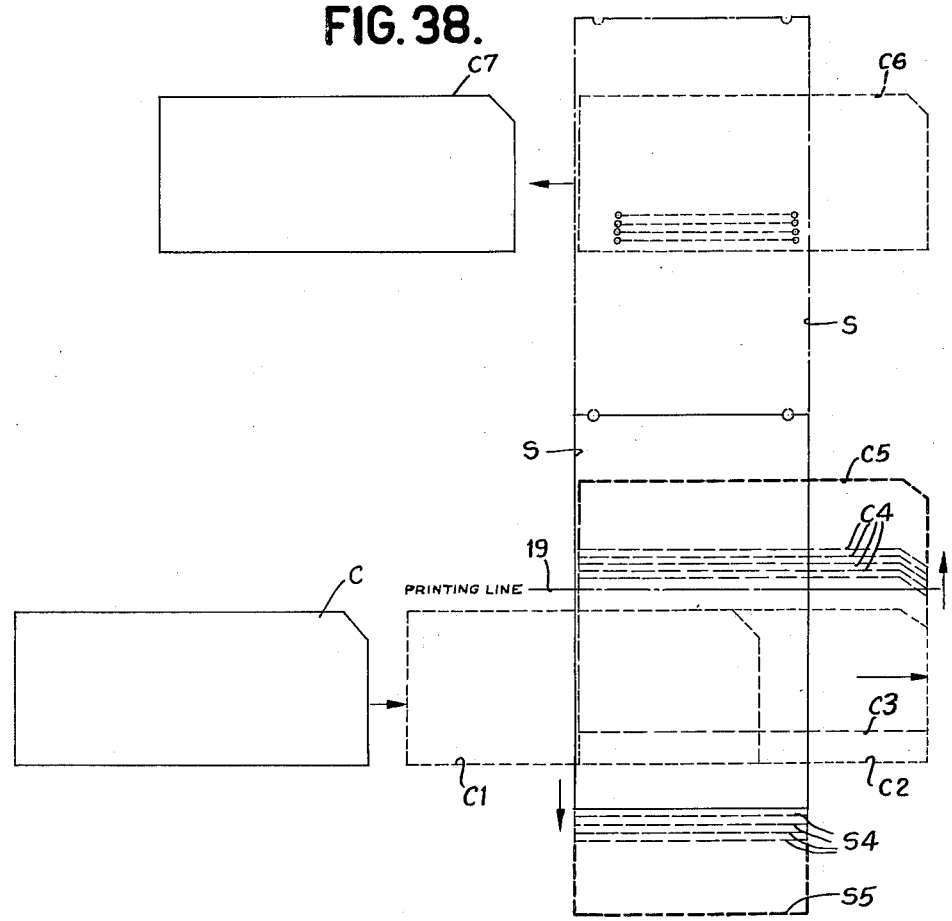
Fig. 38 is a diagrammatic view showing the several relative positions of the record card and sales slip.
Figure 39:
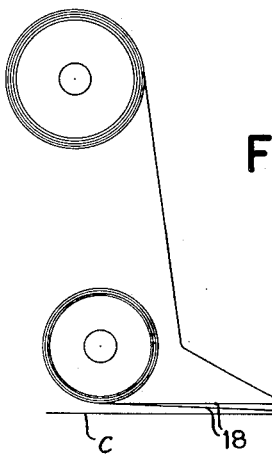
Fig. 39 is a detail showing the manner in which the record card and sales slips are superimposed.

The manner in which the record card C is introduced to and fed through the machine will now be described in detail. Referring to Fig. 38, there is shown diagrammatically the relationship which the record card C bears to the sales slip S during the operation of the machine. Blank record cards are initially positioned at C and a blank sales slip S positioned as shown in full lines. It will be understood that the sales slip S is part of a continuous form from which the individual slips may be separated after they have been prepared. Prior to an entering operation, the record card C is moved from its initial position to the dotted line position designated C1 while the sales slip remains in its full line position. In this position the right hand portion of the card C coincides with the portion of the sales slip in which the name and address of the purchaser may be manually recorded so that such entry made by the operator on the sales slip will also appear on the record card through the medium of the usual carbon sheets indicated at 18 in Fig. 39.

In this figure, the sales slip is shown in duplicate with one strip of carbon between the two and the record card beneath the second sales slip. A second carbon lies between the lower slip and the record card. Thus, any entry made on the upper sales slip will appear on the duplicate slip and also on the record card.

During the next operation the record card is moved toward the right (Fig. 38) to a position C2 and thence upwardly in the direction indicated by the arrow to the position C3 where the first entry position is on the printing line 19. The first printing line 11 of the sales slip is also at this line so that printing will occur on both sales slips and record card. For each printing operation the record card will be moved upwardly step by step to occupy the several positions indicated C4 so that printing may take place on the several lines in succession and at the same time the sales slip S is successively moved downwardly to occupy the positions S4. It will thus be apparent that with the record card C and sales slip S moving in opposite directions, the entries will be made in reverse order on the respective records. Following the last item entry, the record card C is advanced to position C5 and the sales slip to position S5 wherein lines 13 and 16 on the sales slip and record card respectively will be in position to receive printing of the identifying data and the total amount of the transaction. Record card C is thereafter advanced to position C6 in which perforations will be made in field 17 and also in field 14 of the next following sales slip. During the punching operation line 15 of the sales slip will be in printing position and will receive the same impression as made on line 13. Thereafter the card will be ejected toward the left to position C7 and the sales slip S advanced to bring the next section thereof to addressing position. The mechanism for advancing the card C through the machine will now be set forth in detail.

Record card feeding mechanism

In Fig. 8 is shown the hopper 20 in which the blank cards are placed. The picker 21 mounted for horizontal reciprocation is adapted to engage the left hand edge of the lowermost record C and advance it into the bite of feed rollers 22 which advance it to the position C1 indicated in Fig. 38 (see also Fig. 8a). A second picker 23 thereafter engages the left edge of the card and advances it into a carriage 24 which is slidably mounted on guide rod 25.

Power for driving the pickers and feed rollers is derived from motor M (Fig. 7) which through worm 26 drives a cross shaft 27 which has mounted thereon helical gear 28 meshing with gear 29 on shaft 30. Referring also to Fig. 8, the shaft 30 carries a gear 31 meshing with a gear 32 through which the lower pair of feed rollers 22 is driven. By virtue of the gearing just traced, it will be noted that rollers 22 are in constant operation as long as the motor M functions. In Fig. 7, the shaft 27 carries a gear 33 at one extremity which meshes with a gear 34 loose on shaft 35. The latter gear, through idler 36, meshes with a gear 37 loosely carried on shaft 38. Gear 37 (see also Figs. 11 and 14) has clutch connection with a gear 40 which through idler 39 drives a gear 41 secured upon shaft 42. Mounted upon shaft 42 (Fig. 12) are cams 43 and 44 which cooperate with rollers on follower links 45 and 46 to oscillate bell crank members 47 and 48 respectively. Bell crank 47 has connection through link 49 (Fig. 8) with the picker 21 and bell crank 48 has pin and slot connection with the picker 23. Thus, during the rotation of shaft 42, pickers 21 and 23 are operated to advance the record card from its initial position into the carriage 24 which will thereafter advance it to its successive printing positions.

*Card carriage.*—The card carriage 24 (Fig. 13) which receives the record card C after it leaves the address entering position is supported on rod 25

(Figs. 6a, 8a, and 13) and its free end is upheld by the frame 50 of the machine. Projecting downwardly from the carriage are pins 51 which engage an endless tape 52 carried by sprockets 53, which, by their rotation, move the carriage 24 along the rod 25 to advance the record card C into its several printing and its punching positions. The left hand sprocket 53 is drum shaped and contains a driving spring (not shown) one end of which is anchored to the pivot stud of the sprocket and the other to the sprocket itself in such manner that the latter is normally urged in card advancing direction.

*Escapement mechanism.*—The right hand sprocket 53 (Fig. 14) has integral therewith a pair of gears 59 and 60 of which the former meshes with a gear 61 and the latter with a gear 62 both carried by shaft 42. The gear 61 is mutilated as shown in Fig. 14a and during item entering and total printing and punching operations is out of engagement with its coacting gear 59. After the sales slip has been prepared and the record card ejected, the toothed portion of gear 61 engages gear 59 to drive sprocket 53 in a counterclockwise direction and restore carriage 24 to its initial starting position. This action at the same time rewinds the driving spring within the left hand sprocket 53. The gear 62 (Fig. 14) is integral with escapement ratchet 63 (Fig. 14a) which cooperates with escapement pawls 64 and 65 of which the former is normally in engagement with the teeth of the ratchet and the latter out of engagement.

Through the spring drum above described, the sprockets 53 are biased in a clockwise direction and ratchet 63 is consequently biased counterclockwise. While the card is in the C1 and C2 positions of Fig. 38, the relationship of ratchet 63 and pawls 64 and 65 is as shown in Fig. 14a. Rocking of the pawls about stud 66 will release the ratchet so that it may escape and the pawl 65 engages the first of the group of teeth 67. This movement will bring the card from the C2 to the C3 position of Fig. 38 with the first line in printing position. Thereafter, rocking of pawls 64, 65 will escape the ratchet step by step to successively present the several lines of the card to printing position. The initial escapement from the position of Fig. 14a is effected by a wedge-shaped pin 61a secured in gear 61. As the gear is rotated clockwise, pin 61a will strike a pin 64b carried by pawl 64, causing the pawl to release ratchet 63 momentarily and reengage it at the first of the group of teeth 67a.

Figure 40:
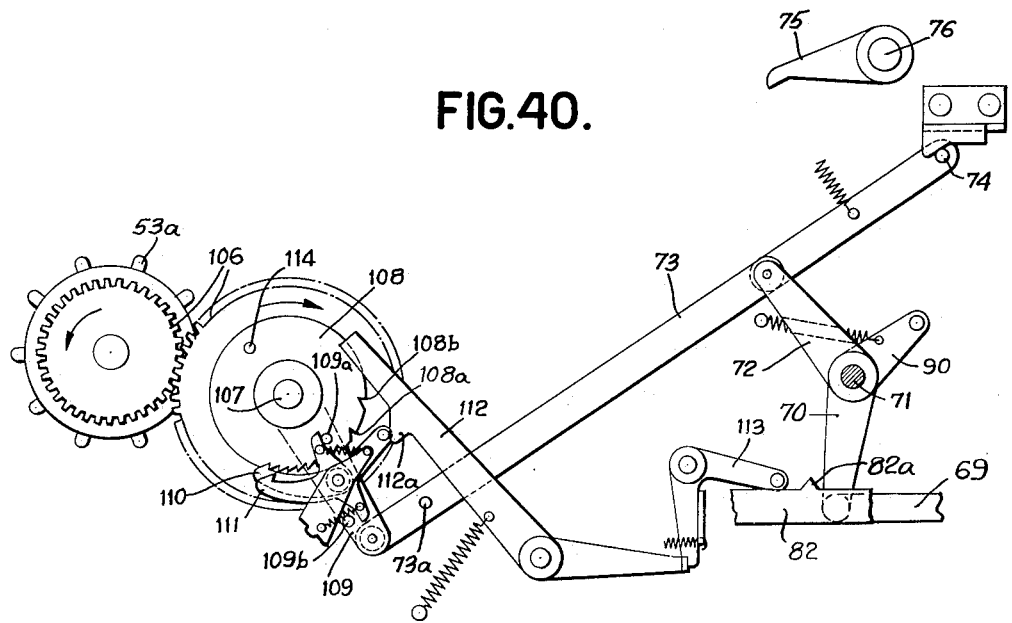
Fig. 40 is a detail of the sales slip escapement mechanism.

Rocking of pawls 64, 65 is thereafter effected through a pin in bell crank 68 which is connected by a link 69 (Figs. 6 and 7) to an arm 70 carried by a rod 71. Secured to rod 71 is an arm 72 whose free end is pivoted to a link 73 (Fig. 40). The upper end of link 73 carries a pin 74 lying in the path of an arm 75 on the shaft 76. During each printing operation, shaft 76 makes one oscillation in a clockwise direction and then back again and during the return movement the arm 75 engages pin 74 to draw upwardly on link 73 and therethrough rock arm 72 and rod 71 in a clockwise direction. Link 69 is thus drawn toward the left and bell crank 68 is caused to actuate pawls 64 and 65 to permit the carriage to escape.

It has thus far been shown how the record card C is first advanced to addressing position and then into the carriage 24 and how the carriage is advanced under control of the escapement mechanism to successively present the several lines to the printing position.

If printing is effected on less than the total number of available printing lines, the operator may cause the escapement mechanism to release the carriage for rapid advance to the total printing position, that is, with line 16 (Fig. 3) in printing position. This is brought about whenever the total key 77 or grand total key 78 is depressed (Figs. 6 and 43). The lower extremities of these keys have cam surfaces engaging pins 79 and 80 in links 81 and 82 and these links cause rocking of shafts 83 and 84 through arms 85 and 86. Both arms 85 and 86 have their extremities connected to a link 87 extending toward the rear of the machine (see also Figs. 7 and 14a). Through this linkage, link 87 is drawn toward the left whenever either of the keys 77, 78 is depressed and a lateral extension 88 which lies in the path of depending arm 64a of the pawl 64 will rock the latter out of engagement with the ratchet 63 so that the carriage 24 may move uninterruptedly toward the right. Its movement in this direction, however, will be interrupted by an arm 89 (Fig. 6a) lying in the path of the carriage and which will interrupt the movement thereof beyond such point. At such time the printing line 16 of the card will be in position to receive the total printing amount and the classification data. During the printing cycle in which such data are placed on the card, the shaft 76 (Fig. 6) will oscillate and again arm 75 will engage pin 74 to rock shaft 71 clockwise.

An arm 90 will engage an arm of stop 89 to rock it downwardly out of the path of the carriage so that the latter may proceed toward the right and will continue such movement until it engages a stop 91. In this position the perforation receiving field 17 of the card will be in punching position.

*Card ejecting.*—During the punching operation the card is in the position designated C6 in Fig. 38 and in this position a card pusher 92 (Figs. 10 and 14) is adapted to engage an edge of the card and move it toward the left as viewed in Fig. 10 into engagement with feed rollers 93. Pusher 92 has pin and slot connection with an arm 94 pivoted at 95 and having a follower arm in engagement with a cam 96. The cam 96 is mounted on shaft 38 whose operation will be further described later. The rollers 93 are constantly driven through gearing designated 97 from constantly running drive shaft 30.

In order to advance the card into the compartment 98 it is necessary to raise the stack of cards therein so that the advancing card may pass thereunder without interruption. This is brought about as follows: The shaft 42 carries a gear 99 through which are driven gears 100 and therethrough gears 101 (see Figs. 7 and 10a). Lifting members 102 located as shown in Fig. 7 are pivoted to gears 101 at their centers through pins 103 and are connected at their extremities to gears 100 by pins 104. The operation is such that as gear 100 rotates counterclockwise, arm 102 will be elevated to raise the stack of cards C and as the member is elevated the clockwise rotation of gear 100 will move the upper extremity of member 102 outwardly away from the stack so that after the new card has been advanced thereunder the stack may lower thereupon.

It has thus far been shown how the record card C is introduced to, advanced through, and ejected from the machine. The manner in which the sales slip is correspondingly advanced will now be described.

Sales slip feeding mechanism

The sales slips S (Fig. 5) are fed from suitable reels at the right of the machine (not shown) through guides 105 and over sprockets 53a at the left or forward end of the machine. Feeding is effected by rotating the sprockets 53a in a counterclockwise direction. Referring to Figs. 6, 7, 13, and 40, the shaft of sprockets 53a has gear connection 106 with a shaft 107 whose other extremity has secured thereto a disk 108 provided with ratchet teeth. Shaft 107 also carries a spring drum 58 (Fig. 13) whose spring is secured at one end to the shaft and at the other to a ratchet 57. When the card carriage 24 is restored and sprocket 53 turned counterclockwise (Fig. 6a) a gear 54 attached thereto will drive gear 55 and pawl 56 pivoted thereto will turn ratchet 57 in the same direction and cause winding of the spring within drum 58. A pawl 57a serves to hold the ratchet 57 in its new position. Thus rewinding of the card carriage driving spring is accompanied by rewinding of the sales slip feeding spring, increasing the tension biasing shaft 107 in a clockwise direction. The movement of shaft 107 is controlled through the escapement mechanism shown in Fig. 40 where disk 108 has cooperating therewith stepping pawl 111 and holding pawl 110 both pivoted on a fixed bracket of the machine. Loosely pivoted on shaft 107 is an arm 109 provided with pins 109a and 109b which cooperate with pawls 111 and 110 respectively. When arm 109 is rocked clockwise, pin 109b releases pawl 111 for engagement with the next ratchet tooth of disk 108 and pin 109a removes pawl 110 from engagement with the first tooth.

The end of arm 109 is connected to the link 73 which as explained above is moved upwardly toward the right for each printing operation. This action will rock arm 109 counterclockwise to cause disk 108 and consequently sprocket 53a to move one step.

After the desired number of items have been listed on the sales slip the depression of the total key 77 will, as pointed out above, draw link 82 toward the left and a camming surface 82a (Figs. 40 and 43) on its upper edge will engage and rock a spring-pressed bell crank 113 which will release the member 112 for rocking movement in a counterclockwise direction. The member 112 through camming projection 112a will cause disengagement of pawl 110 from the ratchet so that the latter is free to turn clockwise uninterruptedly until a pin 114 therein engages the free end of member 112 which will now lie in its path. This movement will position line 13 of the sales slip in position to receive the total printed data. If each available item printing line of the sales slip receives an entry, escapement from the last line position will bring pawl 110 into engagement with tooth 108a and the sales slip will be in position to receive total printing on line 13 thereof. During this printing operation link 73 is moved upwardly again and the pin 73a therein will engage member 112 restoring it to its latched position and causing it to release pin 114 whereupon disk 108 will further rotate to bring the printing line 15 of the sales slip into printing position. For such positioning pawl 110 engages notch 108b. Following such printing the operation of link 73 will again release the disk so that the sales slip may be advanced from the machine and separated from the continuous tape.

Such release will free disk 108 to continue rotation until the first ratchet tooth again engages pawl 110 and the first printing line 11 of the next slip will be on the printing line.

Price tag feeding mechanism

Referring to Figs. 1 and 8, the perforated section T2 of the price tag is inserted in a receiving passageway 115 so that its leading edge engages the first of a series of constantly running feed rollers 116 which thereupon advance it rapidly to analyzing position indicated at 117. The rollers are driven from the shaft 118 which has gear connection with a vertical shaft 119 which in turn is driven from the constantly running shaft 30 (see Fig. 7). The price tag is interrupted in analyzing position by a stop plate 120 positioned in the path of the card. Plate 120 is pivoted about 121 and will remain in the position shown in Fig. 9 until the perforations in the price tag have been analyzed. During such analysis plate 163 is in the dotted line position of Fig. 9 and hook 122 snaps over a shoulder of plate 163. Upon return movement of plate 163 the hook 122 is drawn along and plate 120 will be rocked out of the path of the record card so that the last pair of feed rollers 116 may advance it to the discharge hopper 124. The end of hook 122 strikes a fixed pin 123, releasing the hook from plate 163 so that stop 120 may return to position to interrupt the next tag. Integral with plate 120 is a finger 125 which serves to urge the analyzed price tag into the hopper so that there will be no interference with the entry of the next price tag therein.

Sales person's key or token

Each sales person is provided with a key 126 such as shown in Fig. 11a which is provided with openings 127 of varying length to indicate the sales person's number. The openings in the key shown in Fig. 11a refer to the number 1925; the "1" opening being one unit in length, the "9" opening being nine units, the "2" opening two units, and the "5" opening 5 units. Before the machine can be operated this key must be inserted in one of the key slots 128 of Fig. 1 in accordance with the kind of sale as indicated opposite the several slots. A cashier's key 129 (Fig. 11b) may also be inserted in a slot 130 (Fig. 1). This key also has openings 131 which in the specimen shown in Fig. 11b indicates the number of the key; namely, 761.

Initiating operation of the machine

With a record card C and sales slip S in place in the machine and a price tag inserted in receiving passage 115, the operator will insert key 126 in one of the slots 128. As key 126 is inserted, the lower end will engage and rock a plate 132 (Fig. 29) which has latching engagement as shown at 133 (Fig. 27) with a horizontally slidable member 134 so that insertion of the key in any slot will release member 134 for movement toward the right. The member is provided with a series of lateral extensions 135 which will thereupon move into engagement with notch 126a in the key to hold it in position during the operation of the machine. The right end of the member 134 will engage and close a pair of contacts 136 which function to supply current to the driving motor M which will set the constantly running shaft 30 in operation and cause a feeding of the price tag to analyzing position. Movement of member 134 toward the right will also rock bell crank 146 clockwise and draw upwardly on link 145 (see Figs. 6, 15, and 14).

The lower end of link 145 has connection with an arm 144 loosely mounted on a rod 143. The arm 144 is integral with a clutch releasing arm 147 which normally engages clutching dog 148 to hold it out of engagement with constantly running clutch driving element 149 which as pointed out above rotates as long as the motor operates. The dog 148 is carried by an arm 150 loosely mounted on shaft 38. Integral with the arm 150 is a gear 40 which has driving connection with the shaft 42 so that rocking of latch 147 due to the insertion of the cashier's key will cause rotation of shaft 42. Lying in the path of dog 148 is a second clutch releasing arm 147a which, after the arm 150 has made a fractional part of a revolution will disengage the same from the driving element and shaft 42 will be arrested after having made a corresponding fractional revolution. As explained above, the shaft 42 carries operating cams for feeding record card C from the supply hopper to address position and thence to the carriage 24 and during this operation of shaft 42 these mechanisms function.

As will be more clearly explained hereinafter, the initial starting position of the machine is with a record card in addressing position so that the insertion of the cashier's key will simply cause the card to be moved into the card carriage for further advance and at the same time the carriage will be caused to escape to bring the first printing line of the card in position to receive an impression. This is brought about by the engagement of pin 61a (Fig. 14a) with pin 64b in pawl 64 as explained, it being noted that the supporting gear 61 is carried by shaft 42 whose fractional revolution is insufficient to bring the teeth of gear 61 into engagement with gear 59.

The price tag during this period will have been inserted and advanced into printing position where it is in readiness for analysis and the operator will set up on the keys 151 of Fig. 1 the number of articles.

*Multiplier keys.*—These keys are shown in Figs. 5 and 10 and are normally held upwardly by a common coil spring 152. The usual latching plate 153 is provided for each column to hold the selected keys in depressed position.

*Start key.*—The operator having inserted the sales person's and cashier's keys, and price tag, and having set up the quantity on the keys 151 will then depress start key 137 which will initiate a complete cycle of operations terminating in the printing of the first line of the record card and sales slip. The start key 137 (Figs. 6 and 43) carries a pin 138 in its lower extremity which, upon depression, will engage a spring-pressed dog carried by lever 140 to cause the lever to rock counterclockwise about its pivot and draw a link 141 toward the left. The other end of link 141 (Fig. 15) has connection with an arm 142 secured upon rod 143. Secured upon this rod is a clutching arm 154 (Figs. 14 and 15a) which has the same configuration as arm 147 and lies directly alongside. Arm 154 cooperates with clutching dog 155 and arm 156 which is secured to shaft 38. Release of dog 155 will cause coupling of arm 156 to clutch driving element 157 secured to constantly running gear 37 so that shaft 38 will be driven thereby. Positioned in the path of dog 155 is a second latching arm 158 mounted on a rod 159 which will interrupt the rotation of the shaft after it has made a fractional revolution. During this partial revolution the perforations on the price tag will be analyzed and a setting effected in the machine. This analyzing and setting mechanism will now be described.

*Price tag analyzing mechanism*

The price tag analyzing mechanism is shown in Figs. 5, 16 and 9. Sensing pins 160 are provided, one for each index point position of the price tag. The six lower horizontal rows of pins read the perforations representing the description of the article and the four upper rows read the price. Each pin is provided with a fixed collar 161 against which a spring 162 bears to urge the pin against restoring plate 163. Plate 163 is suitably guided for horizontal movement and has pins 164 extending laterally into engagement with the bifurcated ends of arms 165 secured upon a rod 166. Rod 166 has arm and link connection 167 with cam follower arm 168 whose follower roller is in engagement with a cam 169 secured upon shaft 38. During the fractional revolution of shaft 38 cam 169 will permit arm 168 to rock clockwise so that plate 163 may move forward and such pins 160 as find openings in the record card will advance therethrough.

*Selecting price reading.*—If the price tag contains only one price entry there will, of course, be no perforations in the columns adapted to receive the substitute or "marked down" price and but the single reading will be made. Where, however, there are two prices arranged in alternate columns as explained, the reading of the first price will be rendered ineffective. Integral with each of the pins 160 which read the "original" price perforations is a bar 170 (see Fig. 18) which has a notch 171 and integral with each of the "marked down" price pins is a bar 172 which has a camming projection 173. Extending across all of the bars is a spring-pressed shutter 174 (Fig. 17) which is suitably guided for horizontal movement. Movement of shutter 174 toward the left as viewed in this figure will cause the same to enter notches 171 in all of the bars 170.

Such movement will be brought about by the presence of a perforation in any one of the "marked down" price positions in that a perforation in any such position will permit advance of the corresponding bar 172 and its camming projection 173 will engage shutter 174 and move it into the notches 171. After the pins 160 have taken their reading position and the bars 170 and 172 displaced, the spring-pressed pawls 175 (Fig. 16) are caused to slide forwardly along the upper edges of the bars and take differential positions according to the setting of the pins. For each "original" price index point position and its adjacent "marked down" price position there is a single pawl 175 of sufficient width to ride upon the upper edges of both related bars.

For any pair of related bars 170 and 172 there may exist a number of possible relative conditions as follows: (a) Bar 170 may advance without accompanying movement of bar 172 due to the presence of but a single price; (b) bar 172 may move without accompanying movement of bar 170 due to the presence of a "marked down" price perforation, and the absence of an "old" price perforation in the particular corresponding position; (c) both bars may advance due to a perforation in both "old" and "new" price positions; (d) bar 170 may move without accompanying movement of bar 172 but perforations in other "new" price positions will have shifted shutter 174. For the last three mentioned conditions, namely, *b*, *c*, and *d*, the movement of bar 170 is restricted by shutter 174 so that such movement is slight; whereas, for condition *a*, the movement is full and uninterrupted by the shutter. With the arrangement described, the pawls 175 will move toward the left as viewed in Figs. 16 and 18 whenever any of the conditions *a*, *b*, or *c* exist and such movement will be prevented whenever the condition identified as "*d*" exists.

This is controlled by notches 176 in bar 170, notch 177 in bar 172 and a notch 178 in the first guide bar extending across the slidable bars. These notches normally occupy the relative positions shown so that if neither of the bars 170 or 172 advances the toe of the pawl will move only to position A. For any of the conditions *a*, *b*, or *c*, the pawl will move to position B. Illustrating this with particular reference to condition *c*, the presence of a new perforation will shift shutter 174 into notch 171 so that the bar 170 will move only partly toward the left and the right hand notch 176 will move into alinement with notch 178. However, the accompanying movement of bar 172 toward the left will move notch 177 out of alinement with notch 178 so that there will be no clear opening across the A position and pawl 175 will pass thereover to the B position. Illustrating condition *d*, the bar 170 is moved to the left and right hand notch 176 alined with notch 178. Failure of bar 172 to also move will present a clear cut in position A into which pawl 175 will drop and move less than its full stroke.

Briefly summarizing the operation of this price selecting mechanism, where a single price is present the pawls 175 will move their full extent in all positions in which a perforation occurs. Where there are two prices, the pawls 175 will move their full extent in all positions in which there is a perforation representing a "new" price but will be interrupted in positions in which only an "old" price perforation is present.

In this manner, the prevailing arrangement of combinational hole perforations in each price column will be transferred to combs 179 so that, for example, the digit "9" represented by perforations in the two uppermost rows of hole positions on the price tag T2 will effect movement of the two uppermost pawls 175 and movement of their associated combs 179 toward the left. The manner in which the combs 179 enter into multiplying and type wheel setting operations will be described hereinafter. Combs 179 are controlled in their movement toward the left (Fig. 16) by a bar 180 which has connection with the bifurcated end of an arm 181 secured upon a shaft 182 which has arm and link connection 183 with a cam follower arm 184 whose cam roller is in engagement with cam 185 mounted upon shaft 38 so that as the shaft makes the initial partial revolution combs 179 will be permitted to move toward the left immediately after pins 160 have advanced.

*Setting of the alphabetic data.*—Secured to shaft 182 is an arm 186 which has link connection 187 with a shaft 188 to which is secured an arm 189 whose free end is adapted to cooperate with a vertically slidable bar 190 and move the same downwardly when shaft 182 is rocked counterclockwise. Straddling bar 190 are slides 191 which, when released by bar 190, move downwardly under the influence of springs 192 and take differential positions according to the arrangement of perforations in the alphabetic designation field of the price tag. For each vertical column of alphabetic perforations there are three slides 191, one for the two upper positions, one for the two central positions, and one for the two lower positions. The separate pairs of pins are each associated with a single bar 193.

Considering a single pair of pins 160, for example, the two uppermost pins in the column of six, whenever there is a perforation in both positions, bar 193 will be drawn toward the left its full extent of movement and this will bring its rear end out of the path of steps 194 on slide 191 so the latter may move downwardly its fullest extent which may be expressed as three steps of movement. When neither pin moves forward, bar 193 will not advance and consequently slide 191 will not descend, or in other words, move through no steps. When the upper pin advances without accompanying movement of the lower pin, bar 193 will advance one step until it strikes a block 195 on the lower pin 160. This one step of movement will permit a corresponding one step of downward movement of slide 191. When the lower pin advances without accompanying movement of the upper pin, the bar 193 will advance two steps until stopped by block 195 on the upper pin and slide 191 will be permitted to descend two steps.

Each slide 191 is connected at 196 to a comb 197 which will be displaced one, two, three, or no steps accordingly as the associated slide is positioned. There are thus provided three combs 197 for each column of alphabetic designating positions. Each comb is provided with notches 198 which, by their setting, determine the extent of travel of a common pawl 199 which is adapted to traverse the inner edges of the combs and take any one of thirty-four positions in accordance with the setting of the combs.

The arrangement of the notches 198 is shown in diagrammatic form in Fig. 32 and the relative displacement thereof is indicated in the chart immediately above the combs. Thus, for example, in the fourth position where #1 comb 191 dropped three steps, comb #2 dropped two steps, and #3 comb dropped no steps, the corresponding displacement of combs 197 would aline notches 198 in the fourth position so that pawl 199 in its movement toward the right will drop into such alined opening and its movement thereby interrupted. Interruption of the pawl at this point will position the appropriate character for printing on the sales slip and record card as will hereinafter be more fully explained. In Fig. 33 is shown the combinational arrangement employed for designating the description of the article on the price tag. This arrangement is the well-known Peirce combinational hole system and the manner in which the mechanism responds to such arrangement may be briefly summarized by tracing through a particular character; for instance, the letter D which is represented by a perforation in the uppermost or F position, and also a perforation in the C position. This character, when analyzed by the pins 160, will, as explained, cause the uppermost bar 193 to advance one step, the central bar two steps, and the lower-most bar no steps. In Fig. 32, the corresponding combination of numbers of the combs 191 will position combs 197 to provide a clear opening in the fourteenth position to which pawl 199 will advance to select the letter D. The selection of the other characters may be traced in a similar fashion.

A fixed comb 197*a* is provided with a notch located at each stopping position. This comb provides against the stopping of pawl 199 due to any possible alinement of notches 198 other than in one of the regularly spaced stopping positions. Fig. 32a shows in tabular form the resultant steps of movement for the several possible combinations of perforations in any pair of adjacent index point positions.

Initiation of multiplying operations

Referring now to Fig. 15, shaft 38 carries a cam 200 which just before the shaft is stopped by clutch releasing arm 158 will engage member 201 loose on a shaft 202 and rock the same counterclockwise. The camming surface 203 on the member will engage and rock an arm 204 of clutch releasing arm 205 to release clutching dog 206 for engagement with constantly running clutch driving element 207 whereby shaft 35 will be caused to rotate. Shaft 35 has a compound gear connection, generally designated 208, (see Figs. 5 and 7) with shaft 202, the ratio being such that shaft 202 makes one revolution for six revolutions of shaft 35. Shaft 202 (Fig. 15) has secured thereto a disk 209 whose higher concentric portion cooperates with the free end of arm 204 to hold clutch arm 205 in clutch releasing position for six cycles of operation of shaft 35 toward the end of which the arm 204 will drop into the notch in the disk and shaft 35 will be disconnected from the driving element. During these six cycles of operation of shaft 35, multiplying operations will take place with the value set on the keys 151 as one factor and the price perforated in the tag T2 as the other factor and the product will be entered into suitable accumulating mechanism.

Multiplying operation

*Multiplier read-in mechanism.*—As explained above, the multiplier is set up on the keys 151 (Fig. 1) in which it will be observed that one column is for fractional designations. For the purposes of multiplying, these fractional designations are converted into their nearest three place decimal equivalents so that the multiplier will, in effect, be a five position figure and a cycle of the machine is therefore allotted for multiplication by each order of the multiplier. The lower ends of the keys 151 cooperate with stops 210 (Fig. 5) in bars 211 in such manner that when the "1" key is depressed, bar 210 may move toward the right one step; when the "2" key is depressed it may move two steps, and so on in the usual manner. In the fractional column are provided three bars 211 (Fig. 10) having stops so arranged that the extent of their advance will be in accordance with their decimal equivalent of the fractional value set up on the keyboard. Thus, for example, upon depression of the "⅝" key, the three associated bars 211 will take positions to represent 6, 2, and 5, respectively. In Fig. 5 there is provided a spring-pressed latch 212 for each column of keys, which normally cooperates with the right hand end of the associated bar 211 to hold it in the position shown. Depressing of any key in a column will move its latching plate 153 toward the left permitting latch 212 to rock counterclockwise and release bar 211. Where no key is depressed, it will be obvious that the bar 211 does not move. Each bar 211 is controlled in its movement by a member 213 (Fig. 30) pivoted on a stud 214 (see also Fig. 10) and urged by a spring 215 in a clockwise direction.

The pin 216 carried by member 217 is adapted when rocked in a clockwise direction to release member 213 so that they may move bars 211 toward the right under control of springs 215. Member 217 is connected by a link 218 to an arm 219 secured upon a shaft 220 which carries a second arm 221 which is link connected to cam follower arm 222 whose roller engages cam 223 on shaft 38.

Shaft 38, as will be recalled, makes a fractional revolution when the starting key is operated and it is during this time that the mechanism just traced operates to take the reading of the multiplier from the key setup. The member 213 also serves to position the printing and punching mechanism to record the value of the multiplier. The mechanism controlled for these purposes will be set forth during the description of the printing and punching mechanism.

Following the setting of bars 211 and under control of the multiplying shaft 35 the multiplying combs 224 are positioned, there being one comb for each of the five positions of the multiplier and all the combs 224 will be positioned successively in accordance with the settings of the bars 211 and each bar 211 will be read during a different multiplying cycle to concurrently set the combs 224 during such reading cycle. Thus the highest order bar 211 will be read, to position all five multiplier combs 224 during the first multiplying cycle, the next lower order bar will be sensed to control the positioning of all the bars 224 during the second cycle, and so on. This is effected by the mechanism about to be described.

Figure 41:
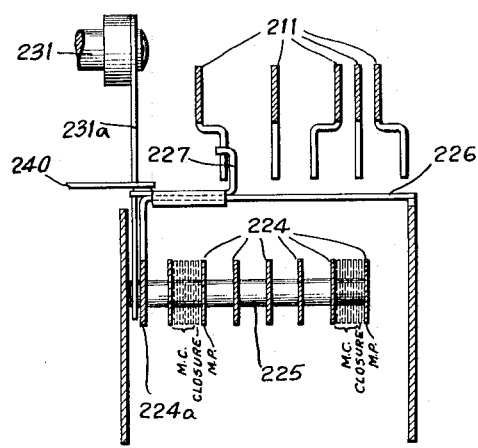
Fig. 41 is a detail of the column shifting mechanism associated with the multiplying devices.

*Column shifting device.*—Referring now to Figs. 30, 41, and 42, a bar 224a to which the multiplier combs 224 are connected through a tie rod 225 has a laterally extending arm 226 upon which is slidably mounted a finger 227. During the first multiplying cycle, finger 227 lies in the plane of the downward projection of the highest order bar 211 as in Fig. 41 and during this cycle bar 224a is moved toward the right as viewed in Fig. 30 so that it will take a position depending upon the setting of the bar 211. At the end of this cycle the finger 227 is shifted into cooperation with the next order bar 211, during the third cycle into cooperation with the third bar, and so on.

Bar 224a and connected multiplier combs are moved into reading position under control of a cam 228 (Fig. 30) which is secured upon the multiplying shaft 35 which, as pointed out hereinbefore, will make six revolutions to effect multiplying operations and will therefore reciprocate the combs six times. The cam 228 cooperates with a follower arm 229 which is connected through link 230 with rod 231 which carries bifurcated arm 231a which is in engagement with the tie rod 225. Referring to Figs. 5 and 34, the shaft 35 carries a cam 530 which cooperates with cam follower arm 531 on rod 232. Rod 232 has arm and link connection 233 with rod 234 upon which is secured a finger 235 which will therefore be oscillated once each multiplying cycle. In Fig. 42, the finger 235 cooperates with a spring-pressed latch 236 pivoted to an arm 237 which is mounted for rotation upon a stud 238. The other extremity of arm 237 carries a spring-pressed pawl 239 which cooperates with teeth in member 240 also pivoted on stud 238.

The end of member 240 has pin and slot connection with the slidable finger 227 and is adapted to advance the same into successive engagement with the five bars 211. The action is such that at the beginning of each multiplying cycle finger 235 is moved toward the left as viewed in Fig. 42 so that the hooked end of latch 236 may engage the same. Near the end of the cycle, movement of finger 235 toward the right will draw with it latch 236 and arm 237. Pawl 239 will rock member 240 one step in a counterclockwise direction when latch 236 is disengaged from finger 235, thus advancing finger 227 into engagement with the next lower order bar 211. Latch 236 is provided with a cam surface on its one edge which cooperates with bracket 236a to cause disengagement of the latch from finger 235 at the end of the cycle whereupon arm 237 will return to a position beyond that of Fig. 42 and in so doing pawl 239 will engage and rock member 240 one step position as shown in Fig. 42. Holding pawl 241 is provided to retain member 240 in its successive displaced positions. After all multiplying cycles have been completed, a lever 242 is rocked about its pivot 243 and through link engagement with a pin 244 in pawl 241 will release the latter from engagement with member 240 so that the latter may return to starting position with finger 227 in alinement with the first order bar 211.

One extremity of lever 242 rests within a notch in link 245 (Fig. 6) which is connected to a pivoted lever 247. Member 247 is connected by a link 248 to pivoted arm 249 (see also Fig. 15) which cooperates with camming element 250 on disk 209. As explained above, the disk makes one revolution during the six multiplying cycles. During the last cycle, camming element 250 engages arm 249 and through the linkage just traced will rock lever 242 to restore the column shifting mechanism.

*Closer comb.*—Adjoining each multiplier comb is a so-called closure comb which functions to prevent any but the proper comb arrangement from controlling the machine. The closure comb is shown at 250 in Fig. 31 and the five such combs are connected together by a tie rod 251 which is straddled by a bifurcated arm 252 connected by a link 253 with cam follower arm 254 whose follower roller is in cooperation with cam 255 on shaft 35. Under control of the cam the combs 250 are free to move toward the right. Each comb is provided with a spring-pressed pawl 256 which rides on the multiplicand and multiplier combs 179 and 224. The arrangement is such that when the multiplier digit controlling operations is an even number the comb 250 advances its full extent, but when the multiplier digit is an odd number and one or more positions of the multiplier contains an odd number, the alinement of the multiplicand and multiplier combs will present an opening to pawl 256 which will drop therein and prevent full movement of comb 250. The manner in which the alinement of the combs brings this about will be more fully explained hereinafter.

*Partial product selection.*—In Fig. 36 is shown the arrangement of notches in the several combs whose positioning mechanism has been described. The upper set of bars represents the notch arrangement on the upper edges of the combs and the lower set of notches represents the arrangement on the lower edges of the combs. Fig. 36 represents the arrangement for one set of combs and it will be understood that there are six such sets in the machine, one for each of the six possible multiplicand denominational orders. As explained above, the multiplicand combs 179 will advance in combinational arrangement according to the digit analyzed.

In Fig. 37 is shown a table indicating the combination of combs 179 which will advance for any given digit; for example, for the digit "4", combs A and C will advance. The distance which any such comb will advance is further dependent upon the value of the number sensed and is controlled by interlocking mechanism between the combs which is shown in Fig. 37a in which pin 257 extends from the D comb into slots 258 in the others and a pin 259 in the A comb extends into the slot 258 of the B comb. From an inspection of the figure it will be obvious that if the two central combs are free to advance, they will move one step into engagement with pin 257, whereas if A comb alone is free to move, it will move one step until pin 259 engages the left end of slot 258 in comb B. The number of steps the combs will take for any given numeral are indicated in Fig. 37 where, for example, the A and D combs are free to move in response to the analysis of the numeral "6". The A comb will move one step and the D comb two steps. The various combinational settings of the combs thus obtainable will effect a predetermined relative re-arrangement of notches indicated generally at 260 in the upper edges of the multiplicand combs and a corresponding re-arrangement of the relative positioning of notches 261 in the lower edges of these combs. The multiplier comb 224 is provided with notches 262 in its upper edge and notches 263 in its lower edge and as pointed out above, this comb is moved toward the right various steps in accordance with the value of the multiplier digit. A scale shown at the left end of Fig. 36 indicates the various increments of movement which the combs 224 may take.

The closure comb 250 is provided with notches 265 in its upper edge and notches 264 in its lower edge. These notches are so located as to permit alinement of notches in all combs at the position corresponding to one of the partial product factors of the two numbers being multiplied.

The multiplicand combs are provided with special notches, generally designated 260a, at the left end of the upper edges thereof which cooperate with the pawl 256. The notches are so arranged that when the combs are relatively displaced in response to the analysis of an odd figure, there will be a clear opening along the line designated "odd" in Fig. 36, across all four but there will be no such opening if the setting is for an even number. The multiplier comb 224 is also provided with special notches 262a arranged so that for odd numbers in the multiplier one of the notches 262a will be in alinement with the line designated "odd" and the comparison of the arrangement of notches 260a, 262a with the multiplier position indicating scale in Fig. 36 and the chart in Fig. 37 will show that where there is an odd number in both multiplier and multiplicand setup, there will be an alinement of notches across the four combs 179 and comb 224 along the line designated "odd". For example, consider the multiplicand combs positioned to represent the numeral "9". According to Fig. 37, for a "9" the A comb is moved two steps toward the left and the B comb one step, this setting preserving the alinement of notches 260a across the combs 179. With a multiplier such as "5", the central notch 262a will be in alinement with the line designated "odd" so that the nose of the pawl 256 will drop into the clear opening provided so that under such condition the closure comb is restrained against movement toward the right to the position designated "even" and will take the position at line "odd" as determined by the clear line of notches at such line during multiplying operations involving an odd number in both the multiplier and the multiplicand.

Whenever both factors are "odd" numbers the right hand partial product will also be "odd" and the closure comb will function to block out the "even" number product positions related to the right hand component of the product. Likewise, if one of the factors is "even" the right hand partial product will be "even" and the comb 250 will block out the "odd" product positions related to the right hand component of the product.

The relationship between the various notches in Fig. 36 may best be brought out by tracing a specific problem. Let us consider the multiplication of an amount such as 8×46, whose product is equal to 368. In operation, the machine will perform the multiplication of the units digit 6 by the multiplier 8 in one order in one set of combs and the multiplication of the tens digit 4 by 8 in the adjacent set. Considering first the multiplication of 8 times 6 in a single order, the product 48 will appear with its right hand partial product of 8 on the lower set of notches and the left hand partial product of 4 on the upper set of notches. Adjoining the notches in Fig. 36 are tabulated the various possible digit combinations for effecting multiplying. On the lower set there is indicated by a heavy line 266 the position at which a clear opening across all combs will occur for the multiplication of 8 times 6. In accordance with the respective movements of the combs the several notches which have been shown in solid black will be alined at 266. This position is eight steps away from a pawl 267 which, as it advances toward the right in a manner to be explained, will be interrupted after eight steps of movement. Similarly, on the upper set of notches the line 268 indicates the position at which a clear opening will occur for the combination of factors selected. A pawl 269 will advance four steps to this position.

In the adjoining set in which the multiplication of 8 times 4 is being performed, a corresponding pawl 267 will advance two steps and a corresponding pawl 269 will advance three steps to set up the partial products of 32. Cooperating with the notches in the upper edges of the combs are several pawls 267 and there are also several pawls 269 in cooperation with the notches in the lower edges. On the scales shown, each pawl is identified as normally occupying a zero position and for any given combination one of the pawls 267 and one of the pawls 269 will advance a number of steps equal to the respective partial products. Thus, as in the example traced, one of the pawls 267 advanced eight steps and one of the pawls 269 advanced four steps. Since both factors are "even" the closure comb 250 will move to the position designated "even" to complete the alinement of notches.

In Fig. 36 there are shown adjacent to the upper and lower sets of notches in the several combs, charts indicating the various multiplicand and multiplier digits and the positions in which they effect clear openings across combs 179 and 224. The upper notches which determine the left hand component take care of all possible left hand components except the digit 8 resulting from the multiplication of 9×9. It is unnecessary to provide a pawl stopping position for this digit as the pawl operating mechanism will advance all pawls 269, 8 steps if they are not sooner interrupted by a clear line of notches.

Similarly, the lower notches which determine the right hand components take care of all possible right hand components except the digit 9 resulting from the multiplication of 1×9; 3×3; 9×1, and 7×7. In this case also the pawls are limited to a 9 step movement and if not interrupted at some intermediate position advance their full stroke of nine steps.

When the closure comb 250 advances to its "odd" position, signifying that both the multiplicand and multiplier digits are odd numbers, the notches 264 related to the right hand component of the product take position to permit the right hand pawls 266 to register in only the "odd" positions and all "even" positions are blocked by the comb. Again, when the comb 250 advances to its "even" position, signifying that one of the factors is even, the notches 264 related to the right hand component of the product take position to permit only registration in the even positions and all "odd" positions are blocked by the comb, inasmuch as there would be no "odd" right hand component under such conditions. The closure comb is provided because, due to the compactness of the notch arrangement, one or more particular combinations of digits to be multiplied may cause the opening of a clear notch across combs 224 and 179 in another position additional to the proper one and comb 250 serves to block out the effect of any such additional opening. For example, in the position designating the product of 7×1, there will be a clear opening seven steps in advance of the pawl 267 when combs 179 and 224 are appropriately shifted. There will also be a clear opening in the position designated 2, 7×1, 6 which is only two steps in advance of the second lower pawl 266 from the left so that, if the second clear opening were not blocked by closure comb 250, the pawls would be interrupted after two steps of movement instead of seven as required. Inspection will show that such condition obtains in those cases where a position takes care of more than one digit, for example, in the position representing 2, 7×1, 6, this position is for the products of 2×6; 2×1; and 7×6, all of which produce a right hand component of 2. It, however, opens the 2 position when 7×1 is represented but, as explained, this is blocked out when both digits are "odd" as is the case for 7×1 so that the other position for 7×1 may be effective. As a further example in the position 4, 9×1, 6, this position is for the products 4×1; 4×6; and 9×6, but a clear opening is also made for 9×1 which is blocked out due to the "odd" value of these two digits.

The notches in the upper edge of closure comb 250 are differently arranged since the general rule applicable to right hand digits as applied to the lower notches does not apply here.

*Operation of the partial product read-out pawls.*—The manner in which the pawls 267 and 269 are advanced along the edges of the combs is best shown in Fig. 34 where multiplying shaft 35, as has been explained, causes rocking of shaft 234. Secured to this shaft is an arm 270 which has operating connection with a horizontally slidable bar 271. During multiplying operations the bar 271 is moved toward the right and pawl carrier 280 upon which the pawls 267 are mounted is permitted to follow the bar under the influence of spring 273. At the end of its stroke, bar 271 will engage a spring-pressed bell crank 274 which normally holds a hook 275 in the position shown. One end of hook 275 is pivoted to an arm 276 spring-urged in a clockwise direction. Upon release of hook 275 by bell crank 274 the hook will be drawn toward the right and a bail 277 integral with arm 276 will rock clockwise to permit spring-pressed detenting pawl 278 to engage one of the teeth 279 in the lower edge of carrier 280.

Upon the return of bar 271, its leading edge will re-engage hook 275 to rock bail 277 counterclockwise, disengaging pawl 278 from teeth 279 and latching bell crank 274 will retain the hook in displaced position.

The sequence of operations is such that pawls 269 take a reading of the tens or left hand partial products before the pawls 267 are advanced to read the units or right hand partial products. Pawls 269 are mounted upon a carrier 272 suitably mounted for horizontal movement. A horizontally slidable restoring bar 281 has connection with an arm 282 which in turn is connected through a link 283 to cam follower arm 284 whose roller cooperates with a cam 285 on multiplying shaft 35.

In the sequence of operations as thus far described, during each multiplying cycle, multiplier combs 224 are advanced to take a reading from the key-set bars 211. The closure comb 250 then takes position under control of both the multiplier combs and multiplicand combs 179 which have been positioned previous to the initiation of multiplying. Thereafter the pawls 267 and 269 which sense the right hand and left hand partial product components respectively are concurrently advanced to differentially position their respective carriers 280 and 272 and at the termination of the advancing movement the detenting pawls 278 are permitted to engage the teeth 279 in the carrier 280.

*Accumulating mechanism*

During the restoring movement of the carriers 272 and 280 the readings thereon are transferred into accumulating mechanism which is about to be described. The timing of the restoring operation is such that the left hand or tens partial products pawls are fully restored before the right hand or units pawls are restored.

During the restoration of the tens pawls the amount entered on the carrier 272 is rolled into accumulating mechanism which thereafter is brought into cooperation with carriers 280 to receive the right hand components.

In Fig. 5 the so-called multiplying accumulator MP is shown disposed beneath the rack teeth of the carriers 272 and 280. After the carriers have been positioned toward the right, the accumulator MP is moved vertically upward so that the accumulating wheels 286 engage the rack teeth on carriers 272. The manner in which the accumulator MP is elevated will now be described.

*Operation of the multiplying accumulator.*—Referring to Fig. 21, a cam 287 carried by shaft 202 cooperates with the roller of follower arm 288 on rod 289. The shaft 202, it will be recalled, makes one revolution during the six multiplying cycles and during the greater part of such cycles the high part of the cam will rock arm 288 counterclockwise so that arm 290 carried on rod 289 will be rocked likewise to draw link 291 toward the left. Link 291 is connected at 292 to a T lever 293 which is pivotally supported at its lower end upon a bell crank cam follower 294 whose follower roller cooperates with a cam 295 on the multiplying shaft 35. Movement of link 291 toward the left will rock T lever 293 counterclockwise so that a bifurcation 296 engages a pin 297 in lever 298 secured upon shaft 299 so that as cam 295 rotates to permit follower 294 to rock clockwise, lever 293 will be drawn downwardly and by virtue of its engagement with pin 297 will rock lever 298 and shaft 299 counterclockwise.

Figure 20:
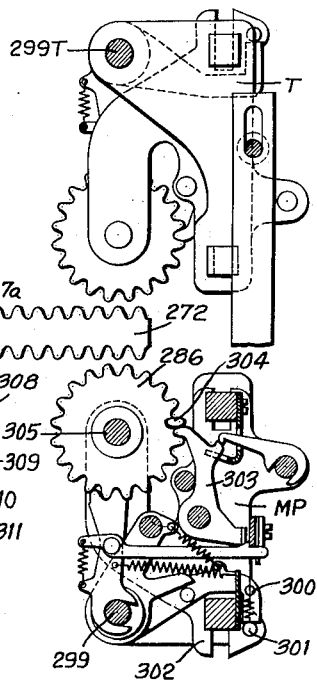
Fig. 20 is a section showing the relationship between two of the accumulators of the machine. The section is taken substantially on the lines 20—20 of Fig. 19.

In Fig. 20, shaft 229 carries a finger 300 whose free end engages pin 301 in frame 302 which is suitably guided for vertical movement and upon which are carried the accumulator wheels 286. Counterclockwise rocking of finger 300 will release frame 202 so that it may be drawn upwardly into engagement with the teeth in the carriers 272, 280. The plate 302 also carries the usual carry pawls 303 which control carrying operations from higher to lower orders in the usual manner. Each wheel is provided with a lug 304 which cooperates with a carry lever 303 for accumulator cancelling, or zeroizing purposes.

Figure 19:
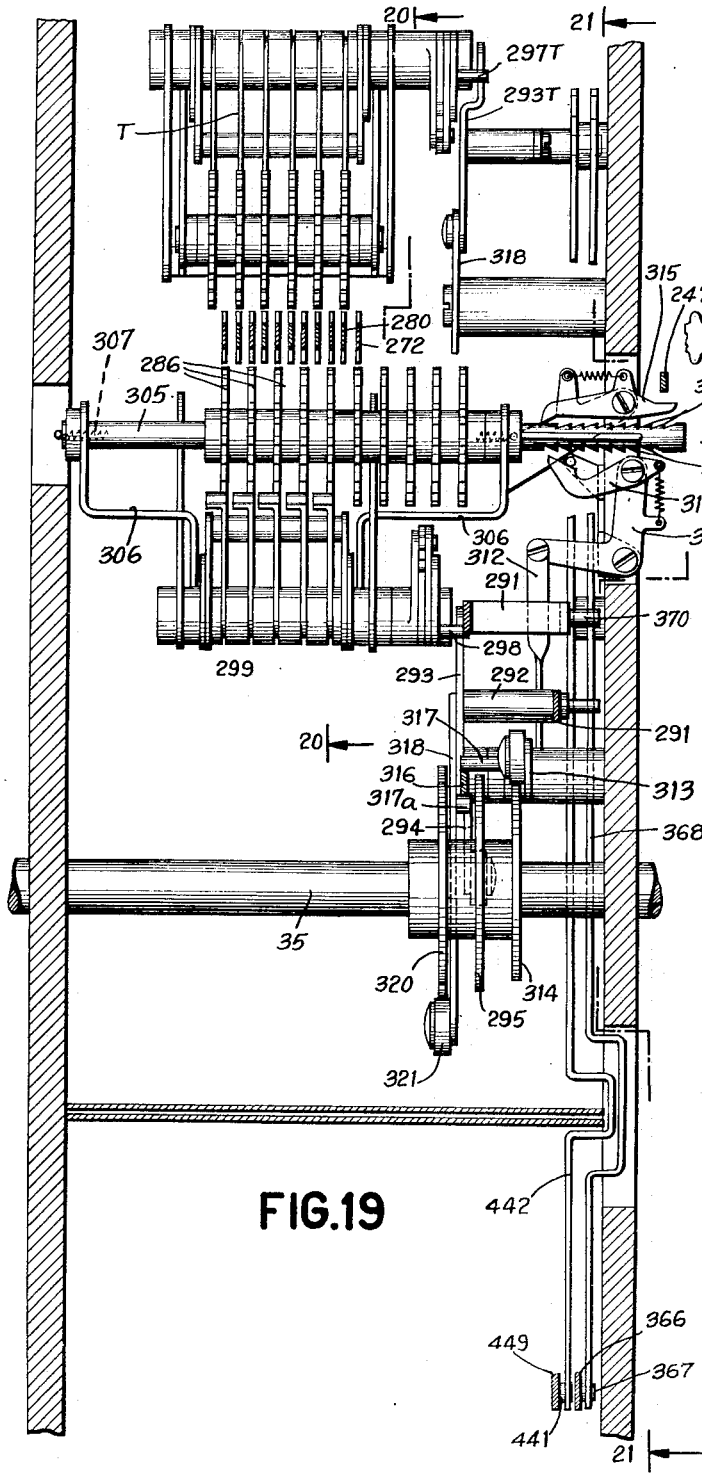
Fig. 19 is a detail view showing the column shifting mechanism associated with the partial product entering devices.

Referring now to Fig. 19, the location of multiplier accumulator wheels 286 at the beginning of multiplying operations with respect to the carriers 272 and 280 is shown. The six wheels 286 farthest to the left are in alinement with the carriers 272 which contain the left hand components of the partial products and after wheels 286 have been elevated into engagement with these carriers, the latter are restored as explained and the left hand components are entered into the wheels. Cam 295 (Fig. 21) then lowers wheels 286 so that they may be shifted toward the left as viewed in Fig. 19 into alinement with the carriers 280. This shifting is controlled as follows:

*Column shifting mechanism.*—The wheels 286 are carried on a shaft 305 which is mounted for horizontal sliding in bracket 306 and normally urged toward the right by a spring 307. The shaft carries an extension provided with detenting teeth 308 and stepping teeth 309, the latter of which are engaged by a spring-pressed pawl 310 carried on bell crank 311 which has link connection 312 (see also Fig. 21) with a follower arm 313 which cooperates with a cam 314 on shaft 35.

Rocking of bell crank 311 under control of cam 314 will shift wheels 286 one step toward the left where they will be held by detenting pawl 315. In this position the wheels are again elevated into engagement with carriers 280 which are then restored and the right hand components standing thereon transferred into the proper orders of the accumulator MP. Following such entry the wheels are again stepped toward the left so that each will now be in alinement with the next higher order carrier 272 and the sequence of operations repeated during the next cycle of shaft 35. Thus, for each multiplying cycle, each wheel 286 will successively receive entries from progressively higher order carriers 280 and 272.

The manner in which the partial products are entered into the MP accumulator and proper columnar alinement obtained may best be summarized with reference to a particular example. For instance, as indicated in Fig. 35, where it is assumed the multiplicand 49.63 is to be multiplied by 27½ converted as explained into 27.500, pawl carriers 272 and 280 have been positioned in accordance with the various partial product components involved and these are successively read into the accumulator. During the first multiplying cycle the partial products derived from the multiplication of 49.63 by 2 are entered into the accumulator in the offset relationship indicated. The oblique lines indicate the related components of the several partial products; for instance, 08 is the product of 2 and 4; 18 is the product of 2 and 9; 12 is the product of 2 and 6; and 06 is the product of 2 and 3.

During the second cycle, the column shifting mechanism functions so that the left hand components of the partial products obtained by the multiplication of the price by 7 are entered into the same column of wheels as the prior right hand partial products and after shifting take place, the right hand components are entered in offset relationship. Similarly, during the third cycle, the partial products obtained by the multiplication by 5 are successively entered so that after the third cycle the complete product 1364.825 will appear in the accumulator. During the remaining two cycles, the multiplication by zeros will result in no movement of the carriers 272 and 280 so that no entries will be made during these cycles.

It will be observed in connection with Fig. 35 that shifting of the accumulating wheels takes place after each separate entry.

*Transferring of the product*

After the several partial products have been gathered into the accumulator MP, the machine will automatically transfer the product into the bill total accumulator T (Fig. 5) and also into the grand total accumulator GT. This is brought about as follows: During the sixth revolution of shaft 35 (Fig. 21) the cam 287 on shaft 202 will permit bell crank 288 to rock clockwise and this in turn will permit counterclockwise rocking of a lever 316 one end of which engages pin 317 in cam follower 313. Such action will draw downwardly on link 312 to shift wheels 286 one step toward the left to aline them with the left hand carriers 280. Arm 316 coacting with pin 317a in member 318 will permit the member to rise under control of its cam 320 which coacts with roller 321 in member 318.

Pivoted to member 318 are T levers 293T and 293GT which have bifurcations similar to those in lever 293 and which, through engagement with pins 297T and 297GT, cause rocking of shafts 299T and 299GT, respectively, of the total and grand total accumulators in the same manner as explained in connection with the operation of the accumulator MP. This action takes place after the carriers 272 and 280 have been moved toward the right as viewed in Fig. 5 during the sixth cycle of shaft 35. During this cycle the movement toward the right will be controlled in accordance with the amount standing in accumulator MP whose wheels 286 are now in line with the carriers 280 which are in mesh with the wheels of accumulator MP.

Release of the wheels for return is effected through link 248 (Fig. 6) which, as previously explained, is drawn downwardly after multiplying operations have been performed to rock bell crank 247 so that an arm 247a thereof may engage holding pawl 315 (see also Fig. 19) to release the wheels for return to their starting position. The rocking of lever 288 (Fig. 21) which as explained has permitted raising of member 318 will also shift link 291 toward the right to rock T lever 293 so that its bifurcation 322 will now engage pin 323 in arm 298 and thereby reverse the operation of the wheels 286 so that where, during multiplying operations, the wheels were elevated after the carriers had moved toward the right, they are now elevated before the carriers advance and will be withdrawn before they have been restored.

With wheels 286 in mesh with the rack teeth of the carriers 280, the carriers will now advance under control of the wheels until lugs 304 (Fig. 20) strike carry pawls 303 at which time the wheels will be at zero position and the amount will have been transferred to the carriers. As explained in connection with Fig. 34, pawls 278 engage teeth 279 of the carriers 280 to hold the latter in position so that wheels 286 may be moved downwardly.

The positioning of the carrier 280 in this manner will position printing mechanism to print the product after which the carriers are again restored toward the left, turning the wheels of accumulators T and GT in mesh therewith, so that the product will be entered into both of these accumulators for accumulation of the products of the several computations.

Concurrently with the operation of the sixth cycle of shaft 35 the shaft 38 (Fig. 15) will resume operation to complete the revolution whose partial operation has already been described. This is brought about through the engagement of a pin 324 carried by disk 209 on the shaft 202 with clutch lever 158 (Fig. 15a). This engagement takes place near the beginning of the sixth cycle of shaft 35 and shaft 38 will rotate until interrupted by engagement of arm 156 and dog 155 with the clutch releasing arm 154. Shaft 38 as explained in connection with Fig. 30, causes rocking of shaft 220. Upon this shaft is mounted a bail 325 which when rocked clockwise will permit fingers 326 to engage and follow pins 327 in the carriers 280 since the carriers 280 at this time more toward the right an amount proportionate to the product in the MP accumulator. Fingers 326 will receive a similar differential displacement.

The lower ends of fingers 326 have connection with pins 328 in horizontally slidably stopping bars 329 to cause differential positioning thereof. Bar 329 (see also Fig. 23) is provided with an extension 330 at its forward end which cooperates with steps 331 in a rocking member 332 which is provided with teeth 334 and is pivoted on shaft 335. A coil spring 336 tends to hold the member 332 against bail 337. The operation of this bail is controlled through a gear 338 integral therewith which meshes with a sector 339 (see also Figs. 5 and 25) pivoted at 340 and connected by a link 341 with cam follower arm 342 which cooperates with cam 343 on shaft 38. Thus, during the rotation of shaft 38, members 332 will be rocked until one of the steps 331 engages the differentially positioned extension 330. During such movement teeth 334 will turn printing wheel 344 through gear 345 to select for printing, the characters corresponding to the product standing in accumulator MP. Near the end of its downward stroke sector 339 will engage a latch 346 to release printing hammer 347 to take an impression from the positioned type wheels. On the return stroke of sector 339, link 348 will be drawn upwardly to retract hammer 347 and latch 346 will engage and hold it in such position.

Referring now to Fig. 4, the printing thus far described is that which takes place in the "amount" field of the lowermost line 11. The manner in which the other items on this line are printed will now be explained.

*Printing of the unit price.*—Referring to Figs. 30 and 36, the undersides of the groups of combs 179 are traversed by pawls 349 which cooperate with combinationally arranged notches 350. The arrangement is such that pawl 349 may travel a number of steps equal to the value of the digit set on the combs.

Pawl 349 is carried by a slider 351 which is connected by an arm 352 to a pin 353 in another stop bar 329. Arm 352 is pivoted on a rod 354 and controlled in its movement by a bail 355 which has link connection 356 with the bail 325 so that it moves in unison with the bail and the bars 329 associated with the unit price field will be positioned concurrently with the bars associated with the product or amount field and printing will take place concurrently therewith.

*Printing of the quantity.*—In the two unit columns of the quantity field fingers 213 (Fig. 30) cooperate with pins 357 in the bars 211 which, as heretofore explained, take differential positions according to the setting of the associated keys. The fingers 213 are pivoted at 214 as explained and their lower ends bifurcated to also straddle pins 353 in bars 329 arranged in the quantity printing position. In the fractional field, as explained, there are three bars 211 which take position in accordance with the decimal equivalent of the fraction. Finger 213 cooperates with the tenths position bar 211 and through a pin 357 therein positions a bar 329 in the same manner as explained for the units order. This is made possible due to the fact that for the fractional amounts selectable by the keys, the tenths decimal positions are progressively ordered as may be noted from the following table:

| | |
|---|---|
| 7/8 | .875 |
| 3/4 | .750 |
| 5/8 | .625 |
| 1/2 | .500 |
| 3/8 | .375 |
| 1/4 | .250 |
| 1/8 | .125 |

Thus, when the 5/8s key, for example, is operated, its bar 211 in the tenths decimal position may advance six positions and the associated finger 213 will shift its bar 329 and consequently its associated printing wheel 344 six steps. In such position the character 5/8 is provided from which printing will take place.

*Printing of the description.*—The manner in which the perforations indicating the description of the article are analyzed has been explained in connection with Fig. 16 where it was pointed out that pawls 199 cooperated with combinationally arranged notches 198 (see also Fig. 25) to differentially interrupt the movement of the pawl in accordance with the character to be printed. The pawl 199 is carried on a member 332a which has connection with printing wheel 344 in the same manner as the members 332 and positioning of the description wheels will take place concurrently with the setting of the other wheels described so that when the printing hammer is tripped, the complete line 11 of Fig. 4 will be printed on the appropriate line of the sales slip. During this sixth cycle, the price tag stop is retracted and the price tag advanced to the receiving pocket 124.

The setting of the multiplier keys 151 is also released at this time as follows: The member 217 (Fig. 30) has pivoted thereto a hook 360 whose free end has latching engagement with an arm on bail 361 (see also Fig. 5). As member 217 is rocked counterclockwise to restore the several stop bars 329, hook 360 is drawn downwardly and the bail 361 will be rocked counterclockwise to engage latches 212 which in turn will actuate locking plate 153 to release keys 151.

The machine will then come to rest and a second price tag may be inserted and a further setting of the keys effected following which the machine will automatically repeat the cycles of operation already described to print a second line of data on the sales slip S and record card C and, as explained, the rocking of the printing shaft 76 will effect spacing of both records.

In Fig. 6, shaft 76 also carries an arm 362 for operating the ribbon feeding mechanism indicated generally at 363 (see also Fig. 8). This ribbon feeding mechanism is of conventional form and a detailed description thereof need not be given.

*Operation of the total key.*—After all the price tags relating to a single transaction have been placed in the machine and analyzed, the operator may depress the total key 77 which will cause the machine to advance the sales slip S and record card C so that their printing lines 13 and 16, respectively, will advance to printing position in the manner already explained. The manner in which printing is effected in the several fields designated on these lines will now be described. Associated with total key 77 is a latching plate 364 (Figs. 6 and 43) which will hold key 77 depressed throughout the total cycle of operations. The plate has an extension in 364a lying in the path of the carriage 24 which will release the keys when it is restored to starting position. As already explained, depression of key 77 will draw link 82 toward the left as viewed in Fig. 6 to cause rocking of shaft 84 (see also Fig. 7).

Rocking of shaft 84, as previously explained, will draw link 87 toward the left to cause release of the carriage escapement mechanism so that both records will advance to present the proper lines to printing position. Shaft 84 has connected thereto an arm 365 to which is pivoted a link 366 extending toward the rear of the machine and carrying a pin 367 in its extremity.

Referring now to Figs. 19, 20 and 21, the pin 367 cooperates with a camming surface on the lower end of a vertical bar 368 to draw the latter downwardly whenever the total key 77 is operated. In Fig. 21 the bar 368 is provided with a slot 369 which, when the bar is moved downwardly, will engage a pin 370 in horizontal link 291 and will hold the link in the position shown, during the total taking cycles. It will be observed that with the link in this position, the T lever 293 associated with the multiplying accumulator MP is held in a mid-position where it is ineffectual to move the accumulator into operative position. The bar 368 is further provided with a camming projection 371 which engages a pin 372 in link 373 whose left end has pivoted connection with the T lever 293GT associated with the grand total accumulator GT. The cam surface will cause the T lever to be shifted to mid-position where it also is ineffectual and the associated accumulator GT will not be operated during this cycle. It will be observed in Fig. 21 that the T lever 293T associated with the accumulator T is normally in engaged position with pin 297T and upward movement of the T lever will cause engagement of accumulator T with the rack bars of the carriers 280.

The operator now depresses the start key 137 and shaft 38 again rotates through a fractional part of a cycle coming to rest after initiating the operation of shaft 35 which will now go through the same six cycles of operation already described. However, since at this time there is no price tag in position and none of the keys 151 have been set, there will be no entries made in the accumulators and no printing will take place under control of the price tag. During the sixth cycle the shaft 38 is released as before to resume operation and it is at this time that the printing on lines 13 and 16 takes place. At the beginning of the sixth cycle, cam 287 releases lever 316 to space the wheels 286 in line with the units carrier 280 and permits member 318 to move upwardly to bring the wheels of accumulator T into cooperation with the carriers 280. The movement of the carriers toward the right at this time will accordingly be controlled by the accumulator wheels; that is, they will be differentially positioned in accordance with the amount standing on the wheels. This amount is transferred through the fingers 326 as before to the appropriate stop bars 329 (Fig. 30).

*Punch selectors.*—Integral with bars 329 (Fig. 23) are laterally extending stops 374 which cooperate with rotatable members 375 provided with steps 376. Member 375 also carries punch interposer fingers 377 which take position above punches 378 in accordance with the combinational arrangement shown in the diagram, Fig. 37. The positioning of members 375 is controlled by ball 379 which is connected by a link 380 to follower arm 381 which cooperates with a cam 382 on shaft 38. The manner of selection may be readily understood from the tracing of a specific example.

With bar 329 moved toward the left in response to a reading of, let us say, "6" in the accumulator, the stop 374 will be in position to engage the "6" step 376 as member 375 rocks clockwise. When such engagement occurs there will be interposer fingers 367 positioned above the two end punches 378 to perforate these positions. This arrangement of perforations corresponds to the designation "6".

After the interposers have been positioned, punch die 383 is moved upwardly against the punches 378 and those above which fingers 377 have been positioned will penetrate the card. Die 383 is mounted for vertical movement and is operated through arms 384 carried on shaft 385. An arm 384a integral with arm 384 is adapted to be engaged by a latch 385a pivoted to follower arm 386 which cooperates with a cam 387 on shaft 38. The latch 385a is normally out of cooperation with arm 384a and is rocked clockwise to engage the card when punching is to be effected. This rocking is effected in the following manner: Latch 385a is connected by a link 388 to an arm 389 carried by rod 390. In Fig. 14 the rod 390 carries an upwardly extending finger 391 which lies in the path of the card carriage 24 (see also Fig. 6a) so that when the carriage is in position to present the punching field to the punches 378, the engagement of the carriage with finger 391 will connect the punch die for operation and punching will take place during the operation of the shaft 38.

*"Amount" printing.*—The printing of the total amount is controlled from the bars 329 in the same manner as explained in connection with the printing of the products, as explained above: that is, the differential positioning of the bars 329 will in turn control the positioning of the stop members 332 (Fig. 23) which in turn locate the printing wheels.

Printed on the same line with the total amount (Figs. 3 and 4) are numerals representing date, machine number, cashier's number, clerk's number, and a symbol representing the kind of sale. The manner in which the type bars are positioned for these separate items will now be set forth. In each case the relationship between the punches and type wheels will be the same as explained in connection with the setting of the total amount; namely, the setting will take place through the bars 329 which position both the punches and the printing wheels so that explanation of the manner in which the printing is set will suffice to explain the setting of the punches.

*"Date" and "machine No." printing.*—In Fig. 1 are provided four knurled wheels 392 and three wheels 393. The first group is adapted to be set in accordance with the date and the second in accordance with the machine number. Each wheel has integral therewith a cam 394 (Fig. 22) with which a finger 395 is adapted to cooperate. On the periphery of each wheel are numerals which may be read through an opening in the casing of the machine and the cam 394 will be positioned in accordance with a particular number.

The fingers 395 (see also Fig. 11) are pivoted on a rod 396 and have depending arms 397 whose lower ends have suitable pin and slot engagement with bars 329 associated with the columns in which the date and machine number are printed. Rod 396 has secured thereto a bail 398 (Figs. 5 and 11) which normally holds the fingers 395 out of cooperation with cams 394. Rocking the bail in a clockwise direction as viewed in Fig. 5 will permit fingers 395 to rock clockwise under the influence of their springs until they engage the cams. This movement is transmitted to the bars 329 which may now, in the familiar manner, position the type wheels and punches. Rocking of shaft 396 is effected as follows: In Fig. 6, the shaft 396 has connected thereto an arm 399 which in turn is connected by a link 400 to a cam follower arm 401 (see also Fig. 15). Follower 401 is normally held in the position shown by a latch 402 whose depending arm has connection with link 87 which, as explained, is drawn toward the left when the total key is operated so that the follower 401 is free to follow cam 403 only during total taking operations and will be latched in the position shown during item entering and multiplying operations.

*Cashier and clerk No. printing.*—In Figs. 27 and 28 are shown the key slots 128 and 130 in which the clerk and cashier keys respectively are inserted. In the plane of the slots 128 are four sliders 404 which cooperate with the cuts 127 in the clerk's key (Fig. 11a). The sliders are provided with steps 405 which control the positioning of the sliders in accordance with the depth of the cut 127. Each slider is provided with eight sets of steps 405 whereby the reading may be taken in any one of the eight possible positions in which the key may be inserted.

In cooperation with the cashier's slot 130 are three slides 406 provided with one set of steps 407 since there is only one position in which this key may be inserted. The slides 404 and 406 have pin and slot connections at their right hand ends with bifurcated arms 408 (see also Figs. 10 and 11) which through telescoping sleeves 409 connect with depending arms 410 (see also Fig. 5). The arms 410 engage pins in the right hand ends of slides 329 lying in position to control printing of the cashier and clerk number fields of the sales slip. A bail 411 secured to shaft 396 controls the positioning of arms 410; that is, as bail 411 is rocked clockwise, the arms 410 will follow and carry therewith arms 408 and slides 404 and 406 until the slides are stopped by engagement with the slots in the keys.

"*Kind of sale*" *printing.*—In Figs. 27 and 29 there is shown a bar 412 mounted for horizontal movement and provided with a series of lateral projections 413 which are adapted to cooperate with the keys 126. The projections 413 are so arranged that they normally occupy different positions with respect to the adjoining key slots. The slide 412 has connection with one of the arms 408 so that when they are released, the slide 412 will move toward the right as viewed in Fig. 27, differential distances depending upon the slot in which the key is inserted. For example, if the key is inserted in the first slot on the left the slide will take one step of movement; if it is in the next slot, two steps; if in the next slot, three steps, and so on, and for each different step of movement the associated bar 329 will position the punches and printing wheels to indicate a different numeral or symbol.

*Punching operation.*—When the various type wheels have been positioned as just explained, printing will be effected and during such printing operation the arm 75 in Fig. 6 will engage pin 74 in link 73 drawing the latter upwardly to cause rocking of the carriage stop 89 (Fig. 6a) which, as above described, will release the carriage for rapid and uninterrupted movement toward the right where the field 17 of the record card will be in position to receive punching. When in this position, the card carriage will have engaged finger 391 (Fig. 14) and in the manner already explained will have released follower arm 386 of Fig. 23 so that punching may subsequently take place under control of cam 387 on shaft 38. In its movement toward punching position the carriage 24 will also engage a bell crank 414 (Figs. 14 and 15) causing the latter to rock and draw link 415 toward the left.

The link 415 has connection with a clutch arm 154 (Fig. 15a) which will thereupon release the clutch to permit a second rotation of shaft 38. The shaft will thereupon rotate through a fractional part of a revolution until interrupted by arm 158.

As explained above, the partial rotation of shaft 38 will initiate a second series of six multiplying cycles which take place without effecting any entries into the accumulators and without causing movement of the pawl carriers as during the first series. This is brought about as follows: The latch 402 which is rocked clockwise under control of the total key (Fig. 15) is adapted when so rocked to engage a pin 416 in an arm 417 rocking the upper end of the arm into the path of an arm 418 and a link 419. The upper end of the link is connected to an arm 420 (Fig. 6).

Arm 418 is secured upon shaft 354 and arm 420 is secured to shaft 252a. Shaft 252a, as explained in connection with Fig. 31, controls the movement of the closure combs, and when thus blocked will prevent the multiplying pawls being interrupted in their movement by the multiplying notches during total cycles. Blocking of shaft 354 will prevent pawls 349 (Fig. 30) from reading the unit price. It will be noted in Fig. 4 that punching of clerk number and kind of sale take place in the same columns as the printing of the unit price during total taking operations and it is necessary to interrupt the operation of the unit price reading devices so that the clerk number and kind of sale may be printed through the same instrumentalities.

Arm 417 has a lateral extension 421 (Fig. 15) which, when the arm is rocked counterclockwise, will push a link 422 toward the right to permit arm 423 and rod 424 to turn counterclockwise. In Fig. 21 rod 424 has secured thereto a latch 425 adapted to engage a notch 426 in member 318, which as pointed out, is lowered during total taking operations to engage the total accumulator T with the carrier racks so that in their movement toward the right they will take position in accordance with the amount standing on the accumulator. Since this amount is to be again printed on another line it is desirable to retain it in the accumulator. This is effected by preventing disengagement of the accumulator wheels from the carriers so that when the latter are restored, the amount will be reentered. The retention by the accumulator is effected by latch 425 which is not released until the second total line has been printed and punched.

During the second series of six multiplying cycles the same operations will take place as explained for the first series and repeated printing will take place on line 15 of the sales slip. In addition, punching of the data will take place since the punching mechanism has been released for operation by the card carriage.

The shaft 385 which rocks only during the sixth of the second series of cycles carries an arm 427 (Fig. 15) which has a pin 428 in its free end. This pin engages the beveled end of link 422, rocking the link out of engagement with projection 421 so that the member 318 (Fig. 21) is released. This permits the accumulator T to move out of engagement with the carriers while in zeroized condition and the carriers are subsequently restored without disturbing the accumulator.

The records are now completely prepared and ready for ejection. It will be recalled that the initial insertion of the clerk's key caused a partial revolution of gear 40 (Figs. 14 and 15) and that clutching arm 147a held the parts in position. The manner in which the revolution is completed will now be explained.

Arm 427 which rocks to effect punching carries a spring-pressed latch 429 which when the arm is rocked will engage under a projection 430 on arm 147a. Thereafter, when the arm is rocked back again it will draw upwardly on arm 428 to draw with it latch 429 which is now engaged with arm 147a. The gear 40 can now complete its revolution during which the carriage is restored to its starting position, upon reaching which it causes release of the depressed total key 77. Incidentally the completion of the revolution of gear 40 causes feeding of a new card into the addressing position and the machine is in readiness to receive entries relating to a new transaction.

*Grand total taking operation.*—At this point both accumulators T and MP are clear and an amount is standing on the grand total accumulator GT, which may be caused to print such amount and reset. For such purpose the key 78 (Fig. 1) is depressed after a clerk's key 126 has been inserted in one of the slots 128. This, as pointed out, will energize the motor and trip the associated clutch to cause a partial revolution of shaft 42. Thereafter the key 78 and then start key 137 are depressed. The power will, through its beveled lower extremity (Figs. 6 and 43) engage pin 80 and urge link 81 toward the left to cause rocking of shaft 83 (Fig. 7). Arm 439 on shaft 83 will draw link 440 to the left and also link 87. The latter will release the escapement mechanisms to advance both the sales slips and card to total print receiving positions. Link 440 (Fig. 19) has a pin 441 at its right hand end which engages and causes lowering of a vertical bar 442 in the same manner that total bar 368 is lowered. This bar has a hook similar to hook 369 in bar 368 for holding the amount accumulator T lever 293 in neutral position and a camming projection 443 (Fig. 21) draws a link 444 connected to T lever 293T to the right to hold it also in neutral position. A second camming projection 445 moves link 373 to the left to engage the T lever 293GT with pin 323GT so that during the ensuing sixth cycle the wheels of accumulator GT will be moved into engagement with the carrier racks as they advance and will consequently set them in accordance with the amount contained in the accumulator. The remaining operations proceed exactly as described for total printing with the machine repeating the printing on the second printing line of the sales slip and punching in the punching field of the next slip with accumulator GT locked in engagement with the carriers until the sixth cycle of the second series when they are disengaged before the carriers return.

Resumé

The general operation of the machine will now be briefly reviewed with particular reference to the sequence of operations. The machine is normally in starting condition with the sales slip in position to receive an impression on the first printing line and with the record card in address receiving position. Insertion of the clerk's key will cause the card to be moved into the card carriage and the carriage escaped to bring the first printing line into position. The price tag is now inserted and if there are several articles, the number thereof is set up on the keys. Thereafter, the start key is depressed and the machine enters upon a series of cycles of operations during which the price tag is analyzed and comb setups effected in accordance with the reading. Six cycles of multiplying will now take place during which the digits of the multiplier are successively set up and readings taken of the partial products. These are entered during the five cycles into the MP accumulator which at the completion of the fifth cycle will contain the complete product. During the sixth multiplying cycle the printing and punching mechanisms are adjusted to print the description of the article and the total price in accordance with the result of the multiplication and the record card and sales slip are advanced to the next line. Insertion of a new price tag and a new setting of the multiplier keys followed by repeated operation of the start key will cause repetition of the series of six cycles during which the next line on the sales slip and record card will be printed. After all the individual entries have been made, the operator will depress the total key.

This will first cause the records to automatically present the total receiving lines in printing position and operation of the start key at this time will send the machine through the six multiplying cycles which, however, will effect no multiplying since there are no factors set up. During the sixth of these cycles the total is read from the total accumulator and the amount is printed in the appropriate position together with the classification data set up in the machine. This series of six cycles is automatically followed by a second series of six similar cycles during which the records are advanced to the punching positions and punching operations take place to record the previously printed information in perforated form. Following this the record card is ejected and a new card moved into adressing position while the sales slip is advanced to first line printing position in readiness for the next series of transactions.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a machine of the class described, computing mechanism, record analyzing mechanism for sensing two separate data designating positions of a record for amount values and for effecting entries into said computing mechanism, and means responsive to the presence of an amount entry in one of said positions for rendering the analyzing mechanism non-responsive to amount designations in the other position.

2. In a machine of the class described, computing mechanism, record analyzing mechanism for controlling said computing mechanism said analyzing mechanism being adapted to sense two fields of a record concurrently for data designations therein representing amount values, and means controlled in response to the presence of designations representing amount values in one field for preventing control of said computing mechanism by designations representing amount values in the other field.

3. In a machine of the class described, two similar sets of data sensing elements for reading data designations representing amount values in two fields of a record card, means for preventing effective operation of one of said sets of elements, means for causing an operation of said preventing means upon the occurrence of a designation representing an amount value in the field sensed by the other set of elements.

4. The invention set forth in claim 22 in which each field of the record is provided with a multiplicity of amount value designating positions and in which an amount value designation in any one position of one field will operate the preventing means to prevent effective sensing of the other field.

5. In a machine of the class described, means for analyzing a record for combinational hole perforations representative of a factor, multiplying slides controlled by said analyzing means to take a combinational setting in accordance with the combinational arrangement of the record perforations, a further multiplying slide differentially positionable in accordance with another factor, key controlled means for effecting positioning of said further slide, a feeler, means for moving said feeler along said slides, said slides having notches therein traversed by said feeler, and means controlled by said feeler and the notches in said slides for effecting multiplication of the factors represented by the setting of the slides.

6. In a multiplying mechanism for handling two digits to be multiplied together, a plurality of multiplying slides, means for causing one or more of a group of said slides to take a combination code setting representative of one of the digits to be multiplied, means for causing another single one of said slides to take a differential setting representative of the other digit, a pair of feeler structures, means for moving said feeler structures along said slides, said slides having markings therein, arranged in accordance with the multiplication table, traversed by said feeler structures, said markings controlling the extent of movement of the structures, one structure in accordance with the tens digit of the product and the other in accordance with the units digit of the product.

7. In a multiplying mechanism for handling two digits to be multiplied together, a plurality of multiplying slides, means for causing one or more of a group of said slides to take a combination code setting representative of one of the digits to be multiplied, means for causing another single one of said slides to take a differential setting representative of the other digit, a pair of feeler structures, means for moving said feeler structures along said slides, said slides having notches therein, arranged in accordance with the multiplication table, traversed by said feeler structures, said notches controlling the extent of movement of the structures, one structure in accordance with the tens digit of the product and the other in accordance with the units digit of the product.

8. In a calculating machine, multiplying devices comprising a plurality of multiplicand elements relatively displaceable in accordance with a combination code to represent a multiplicand digit, notches in each of said elements arranged in accordance with the multiplication table, means to effect alignment of a notch in each element with notches in the other elements in a plurality of different differential positions with respect to one or another of a plurality of reference points, said positions of alignment representing the partial products of the multiplicand digit and all of the digits, a multiplier element settable to represent a multiplier digit, feelers to sense the position of alignment of said notches and means controlled by said multiplier element for causing said feelers to be responsive to the positions of alignment representing the multiplicand times the multiplier digit set on the multiplier element and means controlled by said feelers for controlling a subsequent operation of the machine.

9. In a calculating machine, multiplying devices comprising a plurality of multiplicand elements relatively displaceable in accordance with a combination code to represent a multiplicand digit, configurations in each of said elements arranged in accordance with the multiplication table, means to effect alignment of a configuration in each element with configurations in the other elements in a plurality of different differential positions with respect to one or another of a plurality of reference points, said positions of alignment representing the partial products of the multiplicand digit and all of the digits, a multiplier element settable to represent a multiplier digit, feelers to sense the position of alignment of said configurations and means controlled by said multiplier element for causing said feelers to be responsive to the positions of alignment representing the multiplicand times the multiplier digit set on the multiplier element and means controlled by said feelers for controlling a subsequent operation of the machine.

10. In a multiplying machine with a product forming means, means for receiving and retaining a combinational representation of one multi-denominational factor of a computation, said means including a plurality of sets of slides for each digit of the multiplicand factor, means including a plurality of differentially settable bars with setting means therefor, for receiving and retaining a multi-denominational multiplier factor, each bar receiving a digit of said factor, a plurality of multiplier slides, one for each set of multiplicand slides, said multiplicand and multiplier slides having markings therein arranged in accordance with the multiplication table, means for causing said bars, in succession, to control the positioning of all the multiplier slides to represent thereon, in succession, all the digits of the multiplier factor, feelers, means for moving said feelers over the multiplicand and multiplier slides after each setting of the multiplier slides, said markings in the slides controlling the extent of movement of the feelers in accordance with the product of the multiplicand and the multiplier digit and means controlled by said feelers for accumulating the product of the multiplicand times each multiplier digit to obtain the complete product.

ADELBERT C. MABY
AND
THOMAS A. GAVIN,
*Executors of the Estate of John Royden Peirce, Deceased.*

TORKEL E. TORKELSON.

CERTIFICATE OF CORRECTION.

Patent No. 2,199,548. May 7, 1940.

ADELBERT C. MABY AND THOMAS A. GAVIN,

EXECUTORS OF JOHN ROYDEN PIERCE, deceased, ET AL.

It is hereby certified that error appears in the printed specification of the above numbered patent requiring correction as follows: Page 16, second column, line 58, claim 4, for the claim reference numeral "22" read --3--; and that the said Letters Patent should be read with this correction therein that the same may conform to the record of the case in the Patent Office.

Signed and sealed this 4th day of June, A. D. 1940.

(Seal)

Henry Van Arsdale,
Acting Commissioner of Patents.